United States Patent [19]
Ohara et al.

[11] Patent Number: 4,671,635
[45] Date of Patent: Jun. 9, 1987

[54] MOTORIZED CAMERA

[75] Inventors: Tsunemasa Ohara, Tokyo; Masayuki Suzuki, Kanagawa; Yoichi Tosaka, Tokyo; Ryuichi Kobayashi, Kanagawa; Yoshihito Harada, Kanagawa; Masaharu Kawamura, Kanagawa, all of Japan

[73] Assignee: Canon Kabushiki Kaisha, Tokyo, Japan

[21] Appl. No.: 833,344

[22] Filed: Feb. 25, 1986

[30] Foreign Application Priority Data

Feb. 27, 1985 [JP] Japan .................................. 60-36576
Jul. 29, 1985 [JP] Japan ................................ 60-166971

[51] Int. Cl.⁴ .............................................. G03B 1/00
[52] U.S. Cl. .................................. 354/173.1; 354/214
[58] Field of Search ................ 354/412, 173.1, 173.11, 354/214

[56] References Cited

U.S. PATENT DOCUMENTS 4,272,173  6/1981  Iwashita et al. ................ 354/173.11
4,616,913  10/1986  Suzuki et al. ..................... 354/173.1

Primary Examiner—W. B. Perkey
Attorney, Agent, or Firm—Toren, McGeady and Goldberg

[57] ABSTRACT

A motorized camera having a reversible wind-up motor, a wind-up transmission system whose speed reduction ratio is changed over between small and large values depending on the direction of rotation of the wind-up motor, a rewind transmission system whose motion is routed to the wind-up transmisison system through the roll of film when in rewind mode, and changeover control means responsive to the initiation of a rewinding operation for setting the wind-up transmission system to the small value of the speed reduction ratio.

14 Claims, 16 Drawing Figures

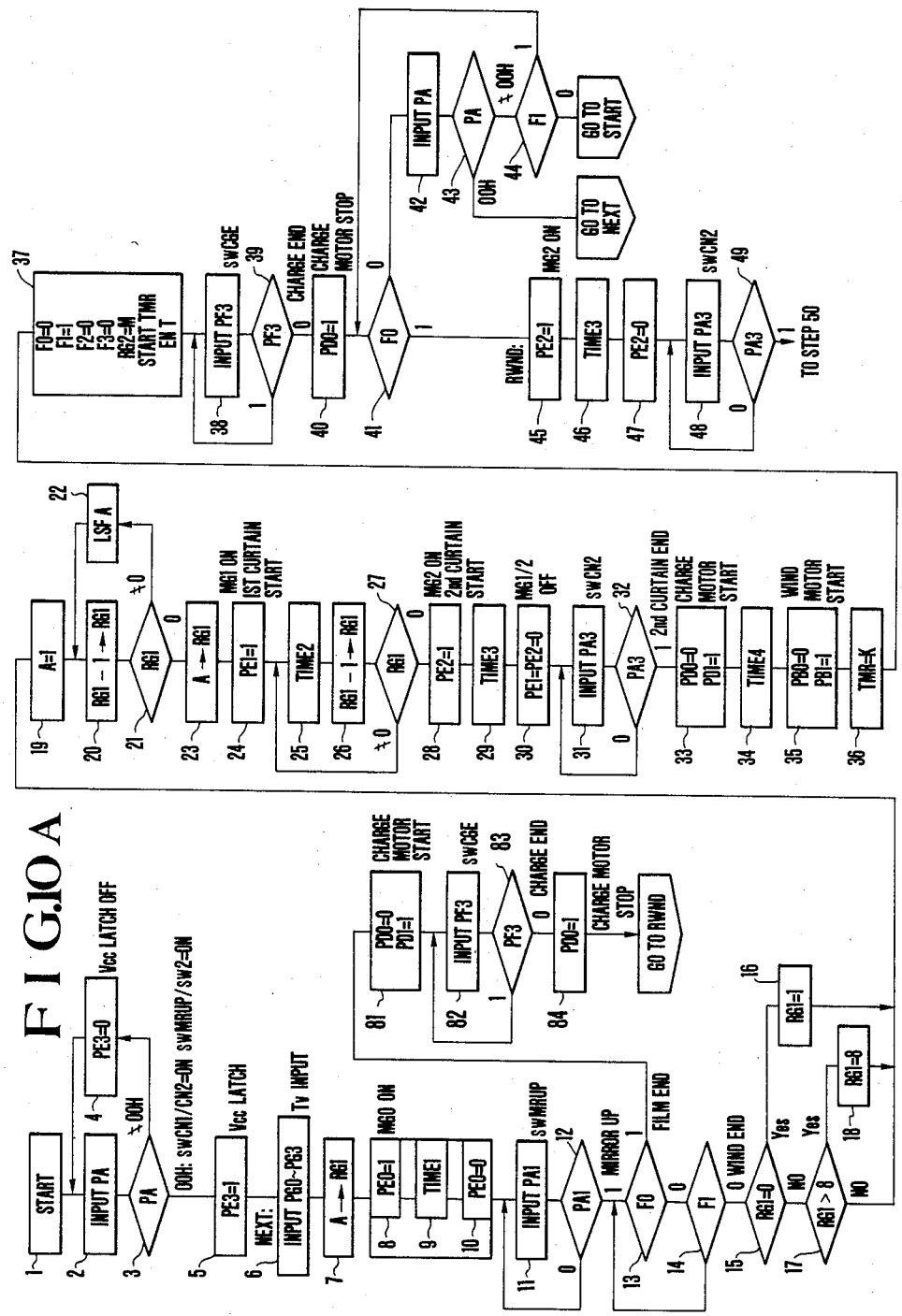

MOTORIZED CAMERA

BACKGROUND OF THE INVENTION

1. Field of the Invention:

This invention relates to motorized cameras in which film is wound up by an electric motor.

2. Description of the Prior Art:

Recently, as motorization of camera advances, introduction of capabilities of automatic winding-up and rewinding has been proposed. For this purpose, according to the prior art, only one electric motor was used in combination with a torque transmission changeover mechanism or clutch at an intermediate point in the wind-up transmission system so that motion of the motor is switched by the clutch to the rewind transmission system.

But, such a method is associated with:

(1) Since, on the layout of the camera, the motor is necessarily put on the opposite side of the film gate to that on which lies the film cartridge chamber, for, as the distance from the motor to the rewind shaft is very long, the rewind transmission is constructed by a gear train, a great number of gears is required and the efficiency of transmission is poor.

(2) Among the loads on charging, the shutter, focusing lens, mirror drive mechanism are not affected by the change of the ambient temperature, remaining almost constant in load, but the load on the take-up spool varies about 5 times, as the convoluted amount of film thereon varies and the ambient temperature changes. So, the speed reduction ratio of the transmission system must be unduly largely increased. Thus charing cannot be performed with high efficiency.

To eliminate the above-described drawbacks, there has been a previous proposal for employing two motors in the wind-up and rewind transmission systems.

Also, to further enhance the effect of the coexistence of the two motors, for example, an additional proposal has been made that the wind-up transmission system is provided with a low speed transmission system of large speed reduction ratio and a high speed transmission system of small speed reduction arranged upon change of the direction of rotation of the wind-up motor to change the speed reduction ratio of the wind-up transmission system so that as the film differs from cartridge to cartridge, and the temperature changes, and further the electrical power source or battery deteriorates, the speed reduction ratio is changed to suit them. As the method of changing over the speed reduction ratio of the transmission system by reversing the rotation of the motor, the planetary gear changeover method is known, being suited to small size instruments such as cameras from the standpoint of space and cost.

But, the use of the separate motors in winding up and rewinding the film results in that as the wind-up motor with its transmission system is linked by the film to the rewind motor with its transmission system, it is when in the rewind mode that the rewind motor rotates even the wind-up motor and the wind-up transmission system. Particularly when the wind-up transmission system is in the large speed reduction ratio an excessive load is laid on the rewind motor. Also, in some occasion, it will lead to damage the film or like accident.

Also, in connection with the use of the planetary clutch mechanism for changing over the speed reduction ratio of the wind-up transmission system between the large and small values by changing the direction of rotation of the wind-up motor, it should be pointed out that in the motor driven transportation device constructed in such a manner that the planetary clutch mechanism is arranged in the wind-up transmission system to be able to drive two wind-up transmission systems and, besides it, the rewind transmission system is made associated therewith, though it is desirable that when in the rewinding operation, the planetary gears of the clutch mechanism of the wind-up transmission system is set in the neutral position (out of engagement with both transmission systems), in actual practice such setting is difficult to do, because the clutch mechanism is of the planetary gear type. So, as it is unavoidable to set the wind-up transmission system in either one of the values of speed reduction ratio, when in the rewind mode, in order to minimize the load on the rewind motor, it is better to select the small speed reduction or high speed transmission system by the planetary clutch mechanism. And, if it is possible to maintain the setting of the wind-up transmission system in the high speed transmission system until the rewinding is completed, the load on the rewind motor could not become excessive. In actual practice, however, there is a possibility of occurrence of an unintentional switching of the clutch mechanism to the opposite state where the low speed transmission system works at an intermediate point during the rewinding. In more detail, the rewinding with the planetary clutch mechanism in the high speed transmission system causes the take-up spool to rotate in the opposite direction to that in which it rotates when in the wind-up mode as the film is trained between the take-up and supply spools, while the wind-up motor is caused to rotate in the opposite direction to that when in the high speed winding up, or in the same direction when in the slow speed transmission system. For this reason, the wind-up motor works as if it were a fly wheel. So if it happens that the rewinding speed changes due to the change of the load during the rewinding, as the speed of rotation of the wind-up motor overtakes the rewinding speed at a moment when the rewinding speed falls, the aforesaid planetary clutch mechanism will be changed over to select the low speed wind-up transmission system for operation, thereby the load is suddenly changed high at an intermediate point during the rewinding. This produces problems of breaking the perforations of the film and cutting off the film itself.

Besides the above-described arrangement of the two transmission systems of different speed reduction ratio in the wind-up transmission system, any wind-up system having the planetary clutch mechanism between the two transmission systems has the above-described problem that the changing over takes place at a time during the rewinding.

SUMMARY OF THE INVENTION

A first object of the invention is to provide a motorized camera capable of preventing the load on the rewind motor from becoming excessive when the film is rewound.

A second object of the invention is to provide a motorized camera in which the clutch mechanism arranged in the wind-up transmission system is prevented from being changed over incorrectly.

Other objects of the invention will become apparent from the following detailed description.

BRIEF DESCRIPTION OF THE DRAWINGS

FIGS. 10A, 10B and 11 are flow charts of the first embodiment.

DETAILED DESCRIPTION OF THE PREFERRED EMBODIMENT

Figure 1:
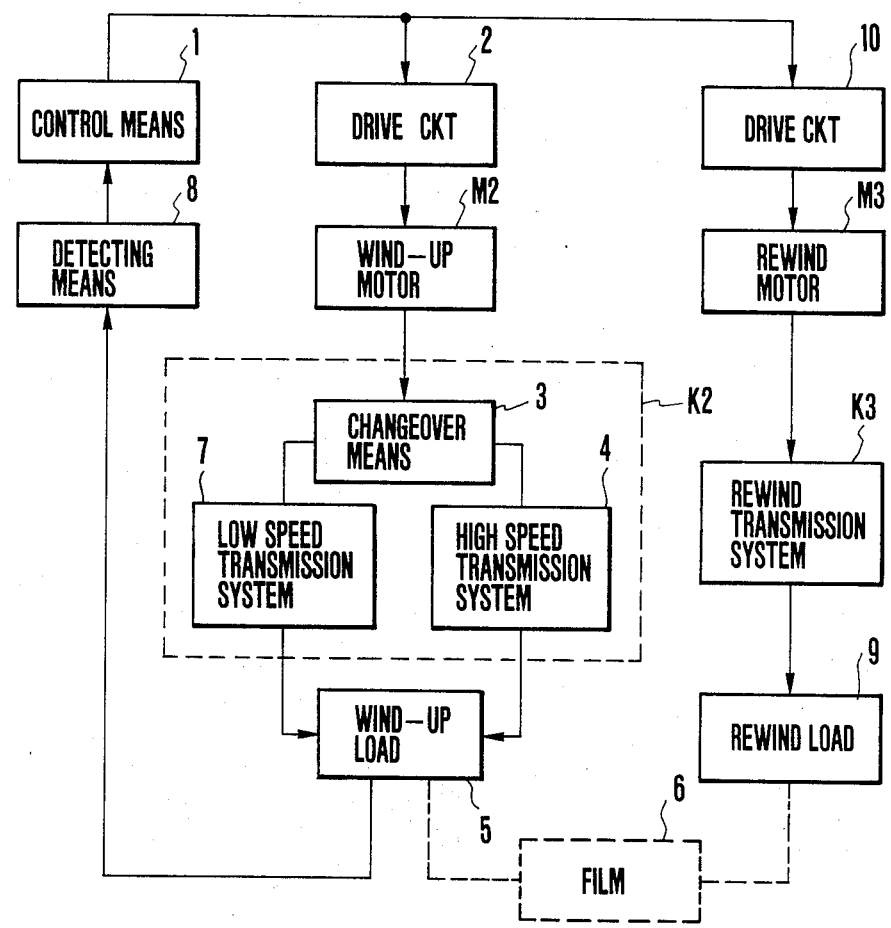
FIG. 1 is a block diagram illustrating a first embodiment of the invention.

FIG. 1 shows the fundamental structure of the first embodiment of the invention.

When in the normal wind-up mode, control means 1 consisting of, for example, a microcomputer, activates a drive circuit 2, causing a wind-up motor M2 to rotate in one direction (for example, normal direction). Thereby, changeover means 3 selects a high speed transmission system 4 of small speed reduction ratio. So, driving torque of the wind-up motor M2 is transmitted through the high speed transmission system 4 to a wind-up load 5 (including a film 6). Thus, the film 6 is wound up at a relatively fast speed.

When the wind-up load 5 is heavy, or when the temperature decreases, or the voltage of the battery drops, or when the film 6 is automatically loaded, the control means 1 causes the drive circuit 2 to rotate the wind-up motor M2 in the other direction (for example, reverse direction). Thereby the changeover means 3 selects a low speed transmission system 7 of large speed reduction ratio. So the driving torque of the wind-up motor M2 is transmitted through the low speed transmission system 7 to the wind-up load 5, thereby the film 6 is wound up at a relatively slow speed. The changeover means 3, the high and low speed transmission systems 4 and 7 constitute a wind-up transmission system K2. Yet, the high and low speed transmission systems 4 and 7 may have common gears constituting part of each of the respective gear trains of speed reduction. In this case, the changeover means 3 takes a form as inserted to a middle point of the transmission systems 4 and 7.

Detecting means 8 detects when winding-up is in progress, just before the completion, or finishes. Responsive to this detection signal, the control means 1 controls the reduction of speed or stoppage of the wind-up motor M2.

When the detecting means 8 does not detect movement of the film 6 despite the wind-up motor M2 is energized, the control means 1 takes it as the film end, causing start of a rewinding operation. Since the rewind load 9 (including the film 6) is connected by the film 6 to the wind-up load 5, wind-up transmission system K2 and wind-up motor M2, if, at that time, the wind-up transmission system K2 is switched to the low speed transmission system 7 of large speed reduction ratio, the load on the rewind motor M3 will be excessive. On this account, the control means 1 has, prior to the rewinding, to cause the drive circuit 2 to rotate the wind-up motor M2 in one direction, thereby the changeover means 3 is activated to select the small speed reduction ratio to establish the high speed transmission system 4. After the current supply to the wind-up motor M2 has once been stopped, the control means 1 activates the drive circuit 10, causing the rewind motor M3 to rotate in one direction. Thereby, the driving torque of the rewind motor M3 is transmitted through the rewind transmission system K3 to the rewind load 9, rewinding the film 6. At the same time, the wind-up motor M2 is supplied again with current in the same direction, so that the changing over to the high speed transmission system 4 is insured. After the elapse of a prescribed time from the start of the rewinding operation, the control means 1 stops the operation of the drive circuit 2, thereby the ends of winding of the windup motor M2 are opened. Even after that, the rewinding continues. When the rewinding is completed, the control means 1 causes the drive circuit 10 to rotate the rewind motor M3 in the other direction, thereby the planetary gear in the rewind transmission system K3 is taken out of mesh. This leads to avoid the addition of the rewind transmission system K3 and rewind motor M3 to the wind-up load when in the wind-up mode. For note, in this embodiment, the control means 1 corresponds to the changeover control means of the invnetion.

According to this embodiment, a surplus load to the rewind load 9 is only the wind-up transmission system K2 changed over to the small speed reduction ratio and the wind-up motor M2 opened across the ends of winding thereof, being limited to as small a level as is negligible in actual practice.

Conventionally, when the speed reduction ratio is changed from the large to the small value by reversing the direction of rotation, the planetary gear in the changeover means 3 is reversed by the shock at the time of the changing over action so that the large speed reduction is selected again. If the meshing of the planetary gear is not perfect, the start of rotation of the take-up spool is followed by taking the planetary gear out of mesh, so that the large speed reduction is selected again. According to the invention, however, because the wind-up motor M2 is supplied with current in such a direction that the wind-up transmission system K2 is changed over to the small speed reduction ratio for a prescribed time from the start of the rewinding operation, it is possible to ensure that the wind-up transmission system K2 is maintained in the changed over position for the small speed reduction ratio.

Also, according to the invention, it is by changing the direction of rotation of the wind-up motor M2 to select either one of the two speed reduction ratios, thereby giving an advantage that there is no need to add any other means, for example, electrically operated magnet device, and therefore that an increase of the complexity of the mechanism and an increase of the size of the system can be avoided.

Though, in the embodiment, the current supply to the wind-up motor M2 when in the rewind mode is interrupted for a while, the current may otherwise be supplied continuously. Another example of variation is that such current supply occurs only before the start of energization of the rewind motor M3.

Figure 2:
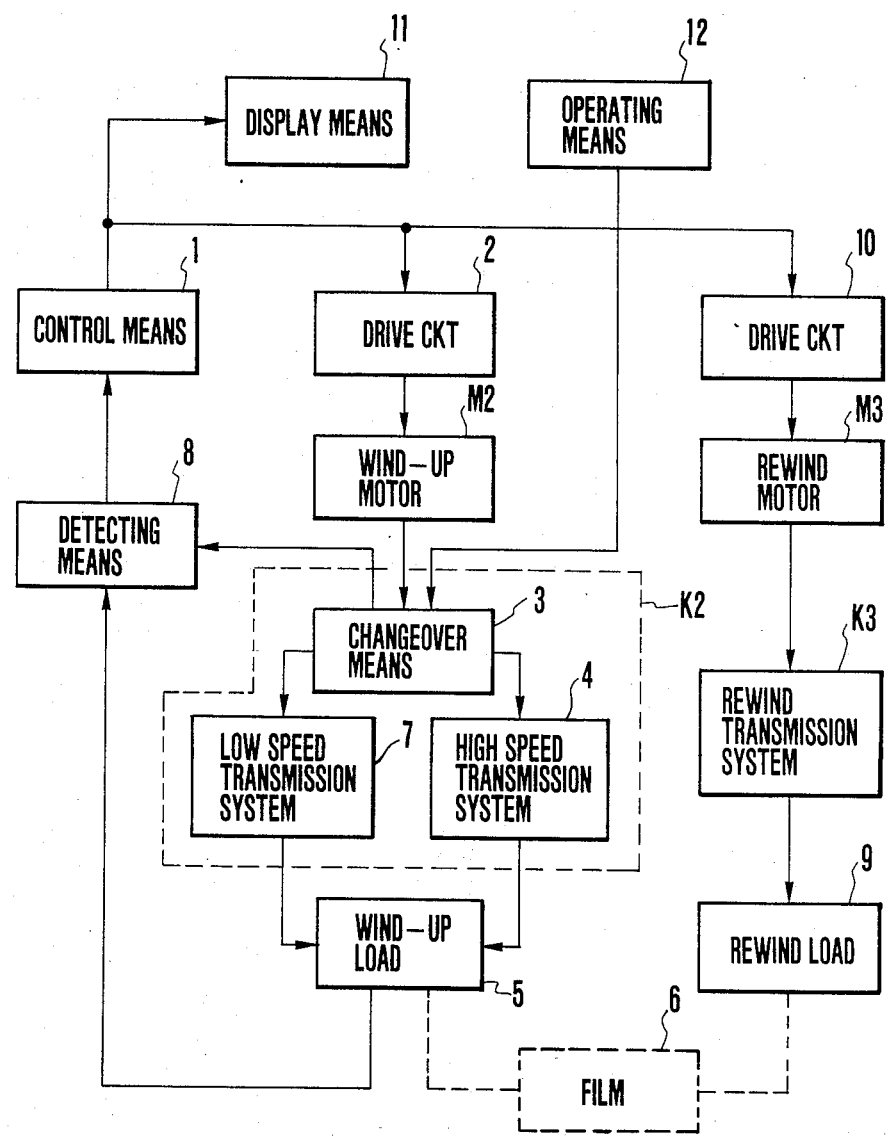
FIG. 2 is a block diagram illustrating a second embodiment of the invention.

FIG. 2 shows the fundamental structure of the second embodiment of the invention, differing from the first embodiment in that the changing over between the speed reduction ratios of the wind-up transmission system K2 is carried out mechanically from the outside of the camera.

A control means 1 responsive to detection of the film end causes a display means 11 to display the film end. Upon looking at this, the photographer manipulates an operating means 12 so that the changeover means 3 selects the high speed transmission system 4. When this changing over is detected by the detecting means 8, the control means 1 activates the drive circuit 10, causing the rewind motor M3 to rotate in one direction. Thereby, the driving torque of the rewind motor M3 is transmitted through the rewind transmission system K3 to the rewind load 9, rewinding the film 6. For note, in this embodiment, the operating means 12 corresponds to the changeover control means of the invention.

According to this embodiment, the changeover means 3 is made operable by the operating means 12, giving an advantage that the control of the wind-up motor M3 is simplified.

An example of a film drive device of the camera in which the embodiments of FIGS. 1 and 2 take a real shape is shown in FIGS. 3 to 7.

Figure 3:
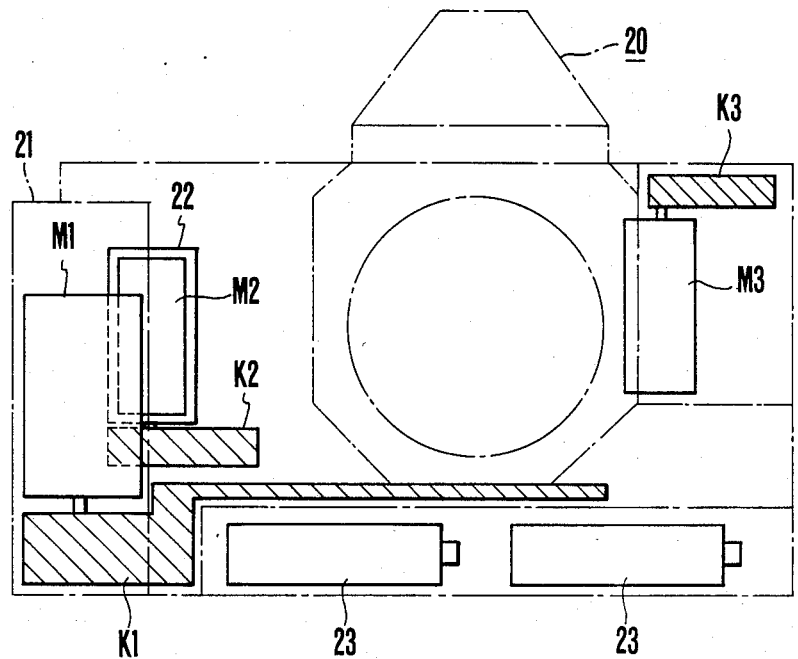
FIG. 3 is a front view of a camera in which the first or second embodiment is embodied.

FIG. 3 shows an arrangement of the aforesaid motors M1 to M3 along with the torque transmissions K1 to K3 respectively associated therewith. Though the change of the atmospheric conditions hardly affects the load on the charge motor M1, its power and size must be relatively large, because it governs charging of the shutter, diaphragm, focusing lens and mirror together with their operating mechanisms. For this reason, the motor M1 is placed within a grip 21 formed as protruding from the front left hand corner of the camera housing 20 as viewed from the front. The windup motor M2 occupies the space within a hollow core of a takeup spool 22. The rewind motor M3 takes its place near a film cartridge chamber in the front right hand side corner of the camera housing. An electrical power source has four cylindrical type batteries 23.

Figure 4:
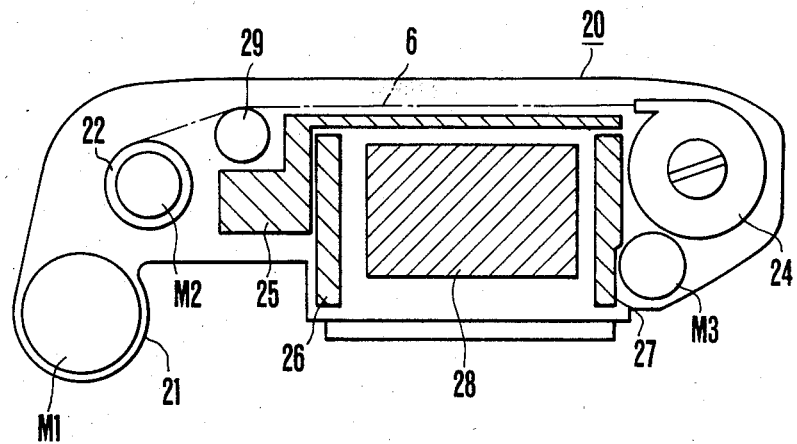
FIG. 4 is a plan view of the same camera.

The relative positions of some of the aforesaid parts are clearly shown in FIG. 4 as viewed from the above of the camera 20, where the film cartridge is denoted by 24, the shutter of vertically running blade type by 25, the mirror operating mechanism by 26, the control mechanism for the diaphragm of the lens by 27, the focusing mechanism by 28, and a sprocket mechanism for indexing the advanced length of one frame of the film 6 by 29.

Figure 5:
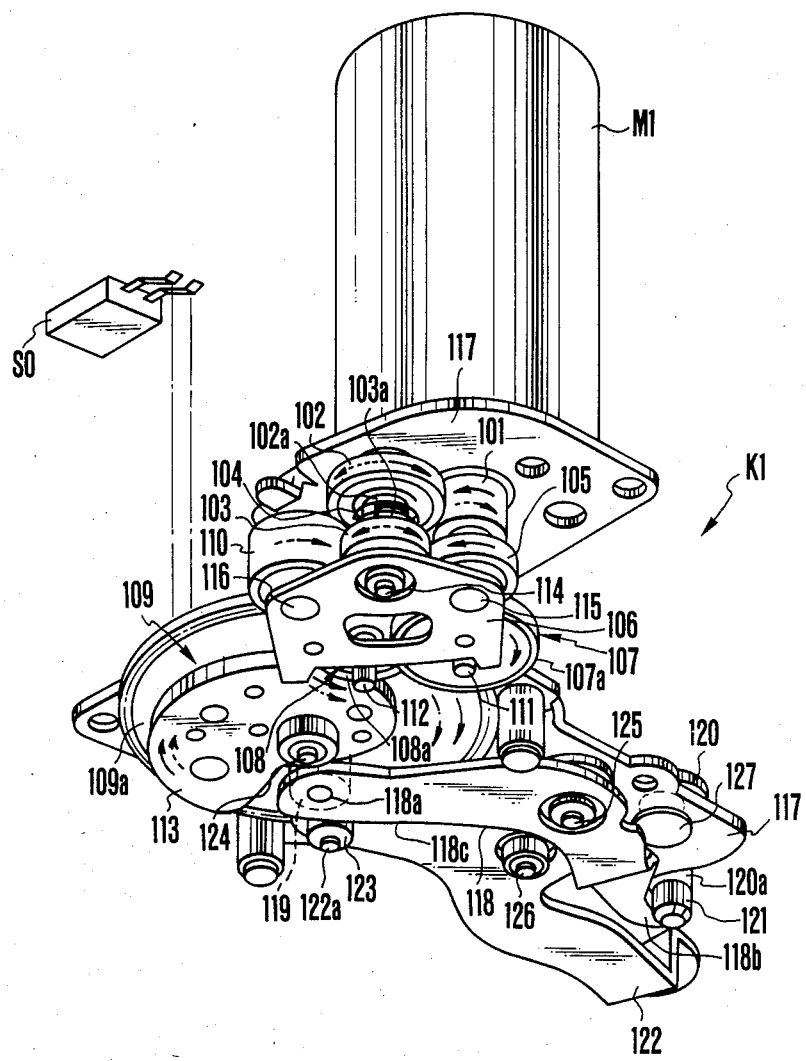
FIG. 5 is a perspective view of the charge transmission system of the same camera.

In FIG. 5 there is shown the torque transmission K1 of the charge motor M1 in detail. A pinion gear 101 on the output shaft of the motor M1 meshes with a gear 102 which constitutes a 2-stage gear together with another gear 103. The gears 102 and 103 are independently rotatably mounted on a shaft 114 fixedly mounted to a base plate 117, and have thrust projections 102a and 103a on the confronting faces thereof so that when rotated, they are unified, but when in axial directions, they are movable relative to each other. The opposite face of the gear 103 is frictionally pressed against a planetary lever 106 by a compressed spring 104 between the gears 102 and 103 so that the planetary lever 106 turns to follow up the rotation of the gear 103. A gear 105 is rotatably mounted on a pin 115 planted to the planetary lever 106 and meshes with the gear 103. Another 2-stage gear 107 has a large gear 107a and a small gear (not shown) fixedly mounted thereon and is rotatably mounted on a pin 111 planted to the base plate 117. When the gear 103 rotates in a clockwise direction, and the gear 105 in a counterclockwise direction (indicated by arrow), the planetary lever 106 is turned in the clockwise direction, thereby the large gear 107a is brought into meshing engagement with the gear 105. A gear 108 is rotatably mounted on a pin 112 planted to the base plate 117, and comprises a large gear 108a and a small gear (not shown) formed on the upper surface of the gear 108a in fixed relation. The large gear 108a is always meshing with the small gear 107b. A gear 110 is rotatably mounted on a pin 116 planted to the planetary lever 106 and is always meshing with the gear 103. When the gear 103 rotates in the counterclockwise direction, the planetary lever 106 is turned in the clockwise direction, thereby the gear 110 is brought into meshing engagement with the large gear 108a. A cam gear 109 is rotatably mounted on a pin 124 planted to the base plate 117 and has a gear 109a and a cam disc 113. The gear 109a is always meshing with the small gear of the gear 108. Depending on the direction of rotation of the motor M1, the above-described transmission is changed over between high and low speed reductions, of which the former is selected when the motor M1 rotates in the counterclockwise direction so that as all the parts rotate in the respective directions indicated by solid line arrows and the planetary lever 106 turns in the clockwise direction, a gear train of the pinion 101→the gears 102 and 103→the gear 105→the gear 107 (large gear 107a and small gear 107b)→gear 108 (the large gear 108a and the small gear 108b)→the cam gear 109 is established, the speed of rotation of the cam gear 109 being slow. Conversely when the motor M1 rotates in the clockwise direction, as all the parts rotate in the directions indicated by dashed line arrows and the planetary lever 106 turns in the counterclockwise direction, another train of gears 101→102, 103→110→108→109 is established, and the cam gear 109 rotates at a high speed. For note, the aforesaid two gear trains are so arranged that the direction of rotation of the cam gear 109 is clockwise no matter which direction the rotation of the motor M1 may take.

A first shutter charging lever 118 is pivotally mounted on a pin 125 planted to the base plate 117 and has a roller 119 rotatable about a pin 118 fixedly mounted on one arm end thereof, the other arm of which is formed to a cam 118b. The roller 119 rides on the outer periphery or camming surface of the cam disc 113, so that as the camming surface goes up and down, swinging movement is imparted into the first shutter charging lever 118. And, such movement causes the cam 118 also to swing. A second shutter charging lever 120 is pivotally mounted on a pin 127 planted to the base plate 117 and has a roller 121 rotatable about a pin 120a fixedly mounted thereon. The roller 121 is in contact with the cam 118 to transmit movement of the first lever 118 to the second lever 120. And, the second lever 120 controls the charging operation of the shutter mechanism (not shown).

A lever 122 for charging the known diaphragm control mechanism, mirror mechanism and focusing mechanism is pivotally mounted on a pin 126 fixedly planted to the base plate 117, and has a roller 123 rotatable about a pin 122a fixedly mounted on one arm thereof. This roller 123 is in contact with a second cam 118c of the first shutter charging lever 118. Therefore, the lever 122 turns to follow up the lever 118, thereby the diaphragm control mechanism and mirror mechanism are charged.

A switch SO cooperates with a signal disc fixedly carried on the opposite surface of the cam gear 109 to that having the cam disc 113 to produce an output signal representing when motion of the charge motor M1 arrives at te cam 113.

Figure 6:
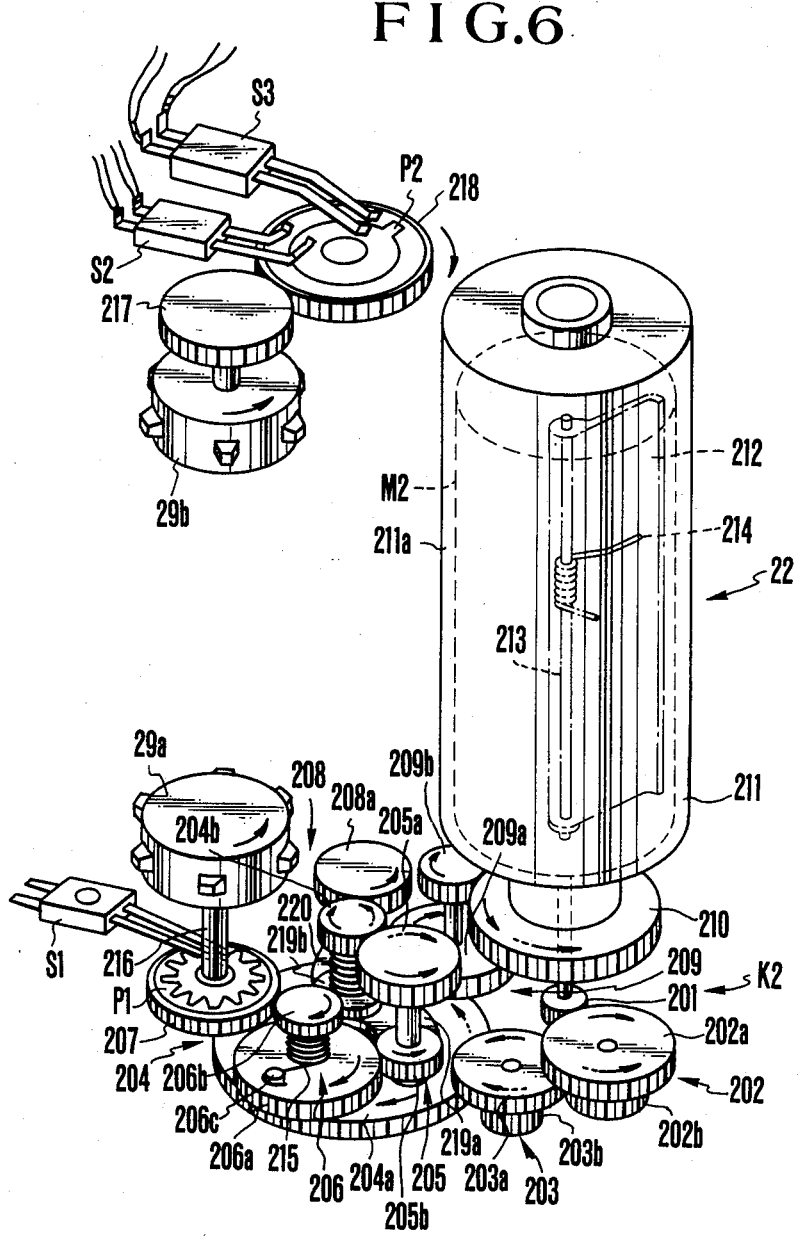
FIG. 6 is a perspective view of the wind-up transmission system of the same camera.

In FIG. 6, the torque transmission of the wind-up motor M2 is shown in detail. A pinion 201 on the output shaft of the motor M2 meshes with a 2-stage gear 202 at a large one thereof. Another 2-stage gear 203 meshes with the first one in between the large and small gears 203a and 202b. A third 2-stage gear 204 meshes with the second one in between the large and small gears 204a and 203b. On a shaft between the large and small gears 204a and 204b is pivotally mounted a planetary lever 219a through a bearing 219b. A compression spring 220 between the small gear 204b and the bearing 219b urges the latter in frictional contact on the large gear 204a. This frictional contact causes the planetary lever 219a to turn in either direction depending on the direction of rotation of the gear 204. The planetary lever 219a has two arms on which fourth and fifth 2-stage gears 205 and 208 are rotatably mounted. Positioned adjacent the fourth 2-stage gear 205 is a sixth 2-stage gear 206 whose large and small gears 206a and 206b are rotatable relative to each other but imparted with a one-way clutching function by a coil spring 215 therebetween. Since one end of the coil spring 215 is fixedly secured to a boss 206 on the upper surface of the large gear 206a, as it rotates in a clockwise direction, the coil spring 215 and the coaxial portion of the small gear 206b are constrained to rotate in unison. A gear 207 meshes always with the small gear 206b and is drivingly connected to a sprocket 29a through a shaft 216. A pulse forming disc P1 whose entire circumference is divided into 12 equal parts is fixedly mounted on the upper surface of the gear 207 and cooperates with a pair of probes of a switch S1. So when the sprocket 29a rotates one revolution, the switch S1 prooouces twelve pulses. With 6 teeth on the drive sprocket 29a, as the camera of 35 mm full size advances the film by one frame for four thirds of its revolution, therefore, the number of pulses produced from the switch S1 is sixteen for each cycle of film winding operation. Needless to say, it is also possible to use a desired number of equal parts of the pulse disc P1. If the duty drive method is employed for controlling the speed of rotation of the motor M2, it is preferred to increase the number of equal parts.

A seventh 2-stage gear 209 is positioned adjacent the sixth one 208 and its small gear 209b meshes always with a spool gear 210 which is fixedly mounted to the bottom of a spool 211. A rubber tube of thin thickness 211a covers the entire area of that portion of the circumferential surface of the spool 211 which receives film to facilitate automatic snatching up of the film leader. A film pressor plate 212 is positioned adjacent the outside of the spool 211 and pivotally mounted on a shaft 213. A spring 214 urges the plate 212 toward the spool 211. This film pressing means facilitates automatic convolution of the film on the spool 211. Though only one pressor is shown, another one is used on the opposite side.

Another sprocket 29b is driven to rotate by the moving film only. Its rotation is transmitted to a gear 217 through a common shaft and further therefrom to another gear 218 constituting part of a detector. The ratio of the number of teeth of the gear 217 to that of the gear 218 is predetermined to be 3:4. A pulse disc P2 is fixedly mounted on the upper surface of the gear 218, consituting part of each of switches S2 and S3 which produce one pulse for one revolution of the gear 218. The switches S2 and S3 are so arranged that the former is closed earlier than the latter by a time for a prescribed phase of rotation of the pulse disc P2. The pulse from the switch S2 changes the driving mode of the wind-up motor M2 to the duty drive, thereby the motor M2 is decelerated. For, as the switch S3 produces the pulse in that time, the motor M2 rapidly stops when it has been braked.

To control the wind-up motor M1 in such a manner is to advance the film by one frame of the 35 mm full size. As a matter of course, if the tooth ratio of the gears 217 and 218 is changed to 3:2, or if, with the tooth ratio left unchanged from 3:4, the pulse disc P2 is divided to two equal parts so that for every one half of revolution, one pulse is obtained, the film will be advanced by half size for each shot. If, in this case, two pulses are used to form one cycle of operation of the motor M2, it will also be possible to bring the advanced length of film back to the full size. Further, if the acceptable number of pulses is made to change over between one and two for every one shot, the camera will get a capability of operating with selection of the full and half sizes of the frame.

The driving torque of the motor M2 transmits as follows: When the motor M2 rotates in a counterclockwise direction, as all the parts rotate in respective directions indicated by solid line arrows, the gear 204 is rotated in a clockwise direction, thereby the planetary lever 219a is turned in the same direction to bring the small gear 205a into meshing engagement with the large gear 206a. Thus, a large speed reduction is established: Pinion gear 201→gear 202 (large gear 202a, small gear 202b)→the gear 203 (large gear 203a, small gear 203b)→the gear 204 (large gear 204a, small gear 204b)→the gear 205 (large gear 205a, small gear 205b)→the gear 206 (large gear 206a, small gear 206b)→the gear 207→the drive sprocket 29a. Another large speed reduction is also established: The gear 204 (large gear 204a, small gear 204b)→the gear (large gear 208a, small gear 208b)→the gear 209 (large gear 209a, small gear 209b),→the spool gear 210→the spool 22.

Conversely when the motor M2 rotates in a clockwise direction, as all the parts rotates in respective directions indicated by dashed line arrows, the gear 204 is rotated in the counterclockwise direction, thereby the planetary lever 219a is turned in the counterclockwise direction to bring the large gear 205a into meshing engagement with the spool gear 210 directly. Thus, a small speed reduction is established: The pinion gear 201→the gear 202 (large gear 202a, small gear 202b)→ the gear 203 (large gear 203a, small gear 203b)→the gear 204 (large gear 204a, small gear 204b)→the large gear 205a→the spool gear 210. In this mode, however, the transmission to the drive sprocket 29a is cut off, and the drive sprocket 29a becomes freely rotatable.

Thus, the two transmissions between the motor M2 and the spool 22 are selectively operated depending upon the direction of rotation of the motor M2. Specifically speaking, when in the counterclockwise direction, the spool 22 rotates at a low speed, while when in the clockwise direction, it rotates at a high speed. It is to be noted here that in either case, the direction of rotation of the spool 22 is always counterclockwise.

It should be pointed out that the choice of the counterclockwise rotation of the motor M2 is exercised only when the camera is set to an automatic film loading mode. Because the high speed reduction of the system K2 operates, the sprocket 29a is driven to rotate, pulling the film out of the cartridge, while the fed portion of the film is taken up on the rotating spool 22. In the subsequent or one-frame-at-a-time or continuous run mode, by the clockwise rotation of the motor, the system K2 is switched to the low speed reduction, driving the spool 22 only to rotate at a high speed. Of course, the wind mode may otherwise be operated by the counterclockwise rotation of the motor M2. Even if so, no slack loop of film between the drive sprocket 29 and the spool 22 is formed, because the peripheral speed of the spool 22 is previously adjusted to be faster than that of the drive sprocket 29a. In other words, the sprocket 29a functions as a drive source for the film only when the film is not pulled by the spool 22. For the other time, it acts merely as an idler.

Figure 7:
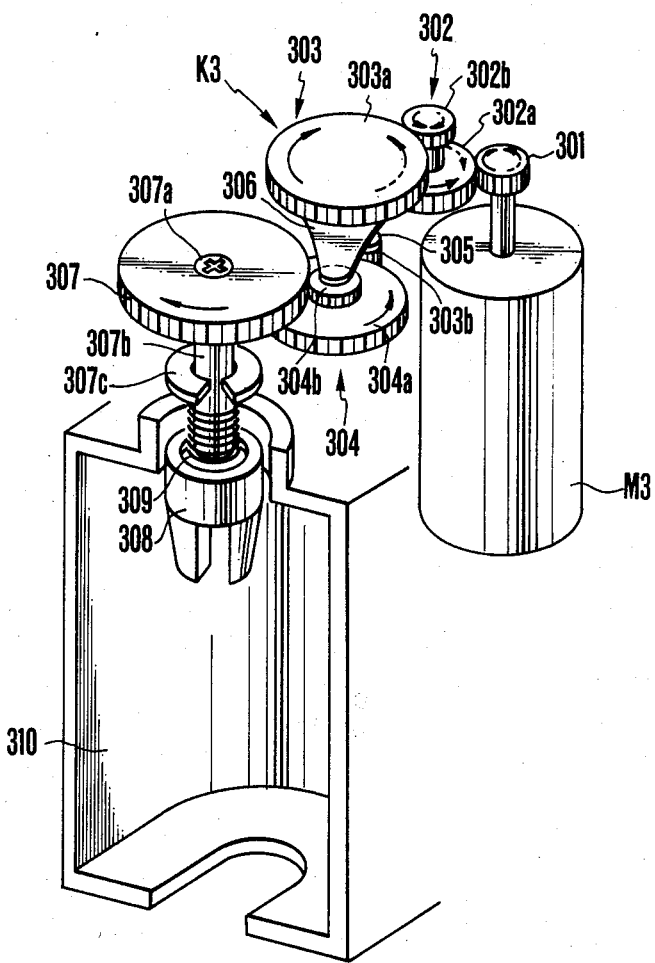
FIG. 7 is a perspective view of the rewind transmission system of the same camera.

In FIG. 7, a torque transmission of the rewind motor M3 is shown in detail. A pinion gear 301 on the output shaft of the motor M3 meshes with a large gear 302a of a 2-stage gear 302 whose small gear 302b meshes with a large gear 303a of another 2-stage gear 303. A planetary lever 306 is pivotally mounted on a common shaft of the gear 303. A compression spring 305 between the small gear 303b and the planetary lever 306 urges the latter in frictional contact with the large gear 303a. By this frictional contact, the planetary lever 306 is caused to follow up the direction of rotation of the gear 303. The free end of the planetary lever 306 rotatably carries a third 2-stage gear 304 having a large gear 304a and a small gear 304b. A gear 307 is fixedly mounted to one end of a shaft 307b by a screw fastener 307a, the opposite end of which movably carries a rewind fork 308. The fork 308 projects into a cartridge chamber 310 and is arranged to be engageable with a hub of the film cartridge (not shown). Positioned between a collar 307c on the shaft 307b and the shoulder of the fork 308 is a coil spring 309 to allow for the fork 308 to retract from the chamber when the film cartridge is inserted thereto or removed therefrom.

When the motor M3 rotates in a clockwise direction, the gear 303 is rotated in the same direction together with the planetary lever 306, thereby the small gear 304b is brought into meshing engagement with the gear 307. Thus, a driving torgue transmission is established: The pinion gear 301→the gear 302 (large gear 302a, small gear 302b)→the gear 303 (large gear 303a, small gear 303b)→the gear 304 (large gear 304a, small gear 304b)→the gear 307→the fork 308. Conversely when the motor M3 rotates in a counterclockwise direction, the planetary lever 306 is turned in the same direction, thereby that transmission is cut off in between the small gear 304b and the gear 307. Hence, for, in the wind mode, the rewind motor M3 and transmission K3 do not partake in increasing the load on the winding-up motor M2, a few angles the rewind motor M3 rotates in the counterclockwise direction is sufficient.

Figure 8:
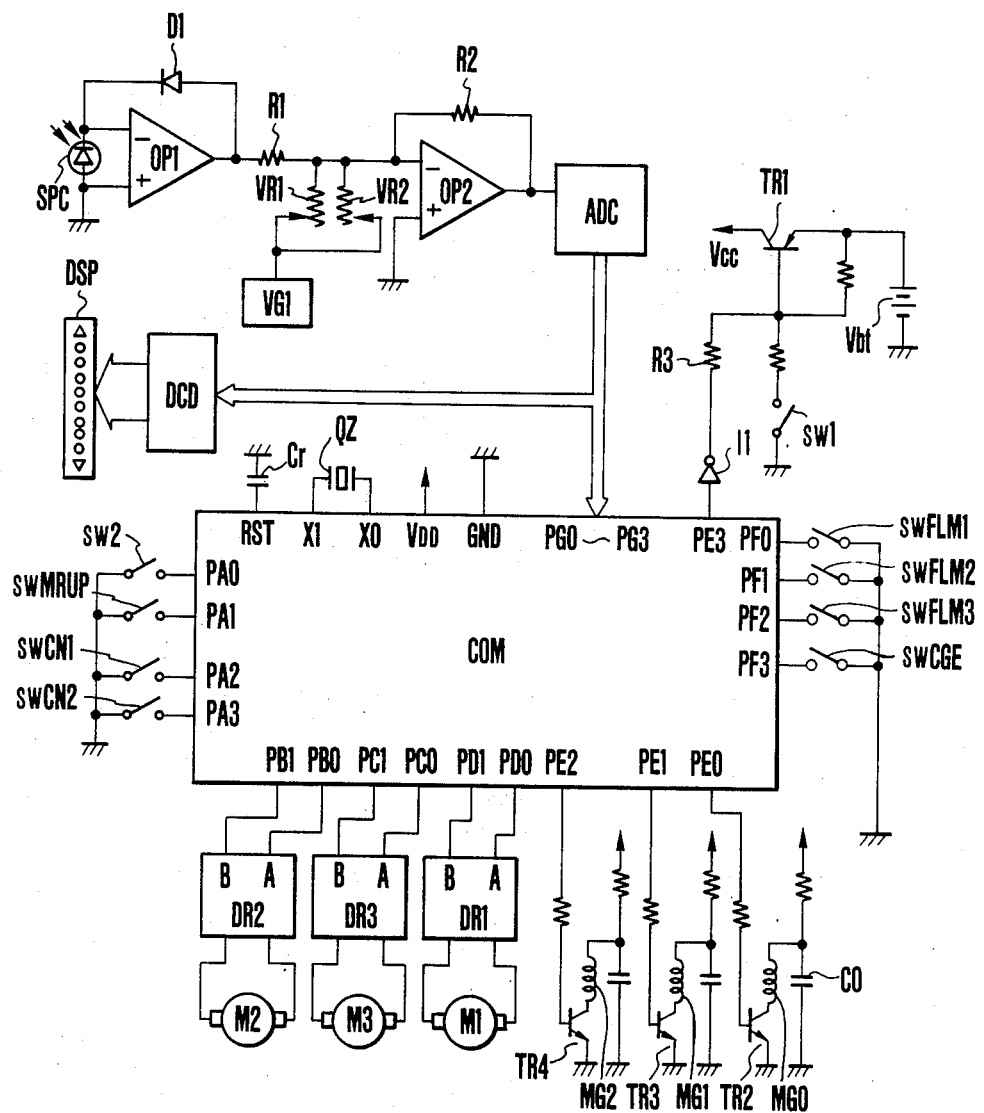
FIG. 8 is an electrical circuit diagram of the microcomputer and peripheral circuits in the first embodiment of FIG. 1.

FIG. 8 illustrates a practical example of the circuitry of the first embodiment in which as the control means 1 use is made of a microcomputer COM. A silicon photo cell SPC is positioned to receive light from an object to be photographed and is connected between two inputs of an operational amplifier OP1 of high input impedance with a compression diode D1 connected in the feedback loop thereof. The operational amplifier OP1 produces an output signal Bv representing the logarithm of the brightness of the object through a resistor R1. Variable resistors VR1 and VR2 are connected to a constant voltage generator VG1 and produce film sensitivity information Sv and aperture value information Av. Another operational amplifier OP2 having a resistor R2 in the feedback loop thereof computes an exposure value i.e. shutter time information Tv based on the formula: Tv=(Bv+Sv−Av). The shutter time information Tv is converted to a 4-bit digital value by an A/D converter ADC and then displayed by display device DSP within the find er through a decoder driver DCD, and applied to input ports PG0 to PG3 of the microcomputer COM. For note, 4-bit binary coded values [0001] to [1000] correspond to 1/1000 sec. to ⅛ sec. and those [0000] and [1001] or more represent warning signals in the display.

When a release button is pushed down to a first stroke, a power switch sw1 is closed, thereby a transistor TR1 is turned on to supply electrical power as a voltage Vcc from a battery Vbt to the various portions of the circuitry. Though not given the Vcc-labelled arrow in the drawing, the operational amplifiers and the A/D converter, for example, are of course supplied with the electrical power. Even after the switch sw1 is opened, the power supply is sustained so long as an output port PE3 of the microcomputer COM produces a signal of low level which is applied through an inverter I1 and a resistor R3 to the base of the transistor TR1.

The microcomputer COM has a terminal RST connected to a capacitor Cr at one pole with the opposite grounded, terminals X0 and X1 between which is connected a quartz oscillator QZ, another terminal VCC connected to the voltage source Vcc, and another terminal GND grounded.

Its input ports PA0 to PA3 are respectively connected to a release switch sw2 arranged to turn on when the release button is pushed down to a second stroke, a mirror-up sensing switch swMRUP arranged upon mirror-up to turn off and upon mirror-down to turn on, a shutter opening sensor or switch swCN1 arranged to turn off or on when the leading curtain of the shutter has run down or charged respectively, and a shutter closing sensor or switch swCN2 arranged to turn off or on when the trailing curtain of the shutter has run down or charged respectively.

Another input ports PF0 to PF3 are respectively connected to a first film switch swFLM1 comprising the pulse disc P1 and the pair of contacts S1 (FIG. 6), a second film switch swFLM2 comprising the pulse disc P2 and the pair of contacts S2 (FIG. 6), a third film switch swFLM3 comprising the pulse disc P2 and the pair of contacts S3 (FIG. 6), and a charge switch swCGE comprising the signal disc on the cam gear 109 (FIG. 5) and the pair of contacts S0 and arranged to turn on when the charging operation is completed.

Its output ports PE0 to PE2 are connected to the bases of transistors TR2 to TR4 respectively controlling the current supply to a permanent magnet-equipped solenoid MG0 of the first latch for beginning a mechanical release operation, a leading curtain release solenoid MG1 and a trailing curtain release solenoid MG2.

Another output ports PB0 and PB1 are connected to a drive circuit DR2 for the wind-up motor M2. Another output ports PC0 and PC1 are connected to a drive circuit DR3 for the rewind motor M3. Another output ports PD0 and PD1 are connected to a drive circuit DR1 for the charge motor M1.

Figure 9:
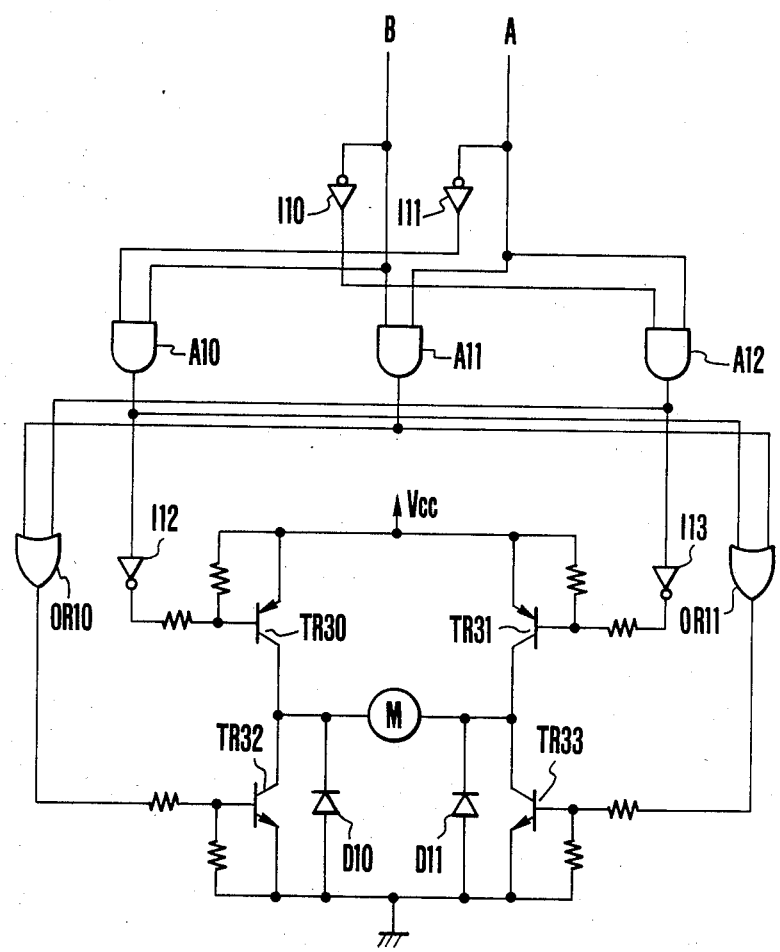
FIG. 9 is an electrical circuit diagram of the drive circuit of the first embodiment.

FIG. 9 illustrates the details of each of the drive circuits DR1 to DR3, where two input terminals A and B receive a 2-bit signal. At first, for A=1, B=0, because the input B is inverted by an inverter I10, the output of an AND gate A12 is "1", and the output of OR gate OR10 is also "1", thereby a transistor TR32 is turned on. Also because the output of an inverter I13 is "0", a transistor TR31 also is turned on. Therefore, the voltage Vcc of the battery is applied across the motor M with current flowing in such a direction that the motor M rotates in a normal direction.

To A=0, B=1, because the input A is inverted by an inverter I11, the output of an AND gate A10 becomes "1", the output of an OR gate OR11 also becomes "1", and the output of an inverter I12 becomes "0", thereby transistors TR30 and TR33 are turned on. As current flows to the motor M in the reverse direction, the motor M rotates in the reversed direction.

For A=1, B=1, the output of an AND gate A11 is "1". Therefore, the outputs of the OR gates OR10 and OR11 take "1" simultaneously, turning on the transistors TR32 and TR33. Hence, if this signal appears at a time during the rotation of the motor M, not only the current supply to the motor is cut off no matter which direction of rotation of the motor M may be by diodes D10 and D11 and the transistors TR32 and TR33, but also the winding of the motor M is short-circuited to brake the motor M against the further rotation by inertia.

When A=0, B=0, all the outputs of the AND qates A10 to A12 have "0", causing the transistors TR30 to TR33 all to turn off, so that the motor M is in open state.

Figure 10B:
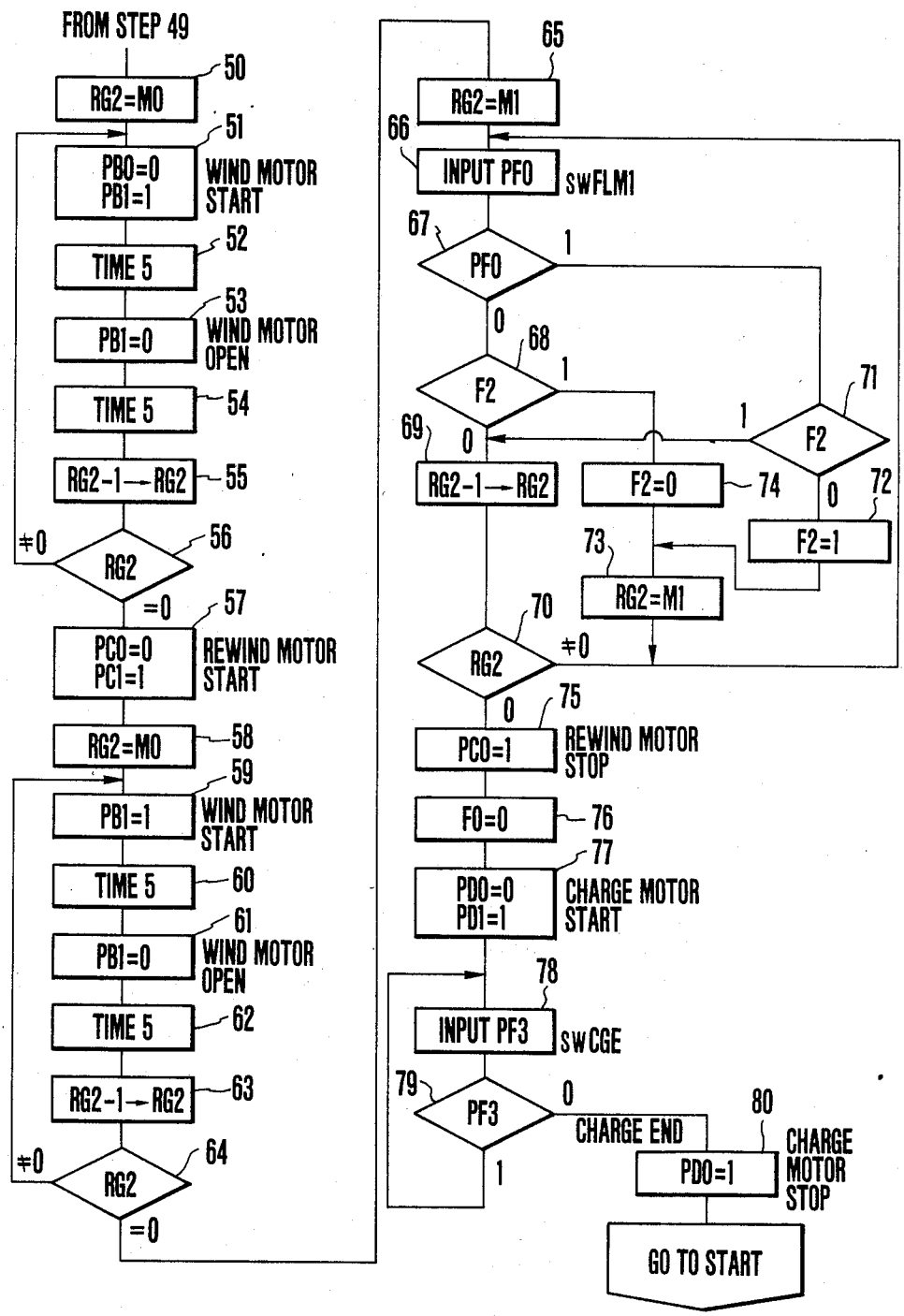
Figure 11:
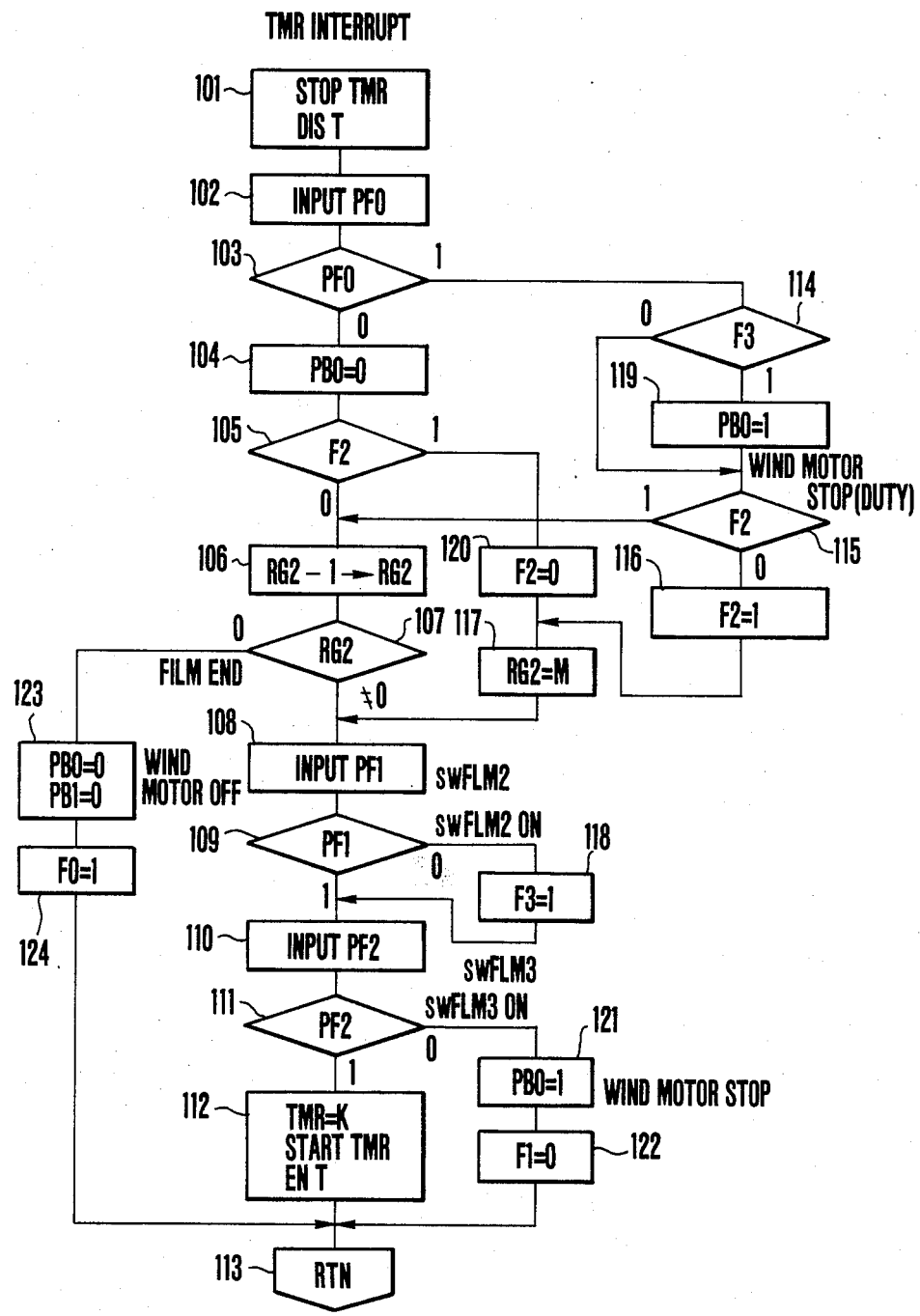

The operation of the microcomputer COM is next explained in detail by reference to the flow chart of FIGS. 10A, 10B and 11.

Step 1: By the supply of the battery voltage Vcc in response to closure of the first stroke dependent switch sw1, the microcomputer COM is started to operate. A train of clock pulses from the quartz oscillator QZ are received, and at the same time, a power-on reset is executed by the capacitor Cr. A built-in program counter is initialized to No. 0 address, causing program execution to begin with the block labeled "START". Here, all the flags are assumed to have "0" and all the output ports also to have "0".

Step 2: Inputs from the ports PA0 to PA3 (hereinafter referred to as "PA" inputs, and this holds for the other ports) are received. If all the portions of the camera are in their charged positions, then when the photographer further pushes down the release button to the second stroke, PA0=PA1=PA2=PA3=0 result. Thus the PA inputs have a value of [00H] in the hexadecimal number system.

Step 3: If the PA inputs are [00H], jump to step 5. If not, advance to step 4.

Step 4: Now assuming that the PA inputs are not [00H], then the PE3 output is changed to "0". Since, at the time of the power-on reset, all the output ports are "0", this command is meaningless. But because the program has a loop to step 1, it is at this time that it has meaning. (Latch release of the battery voltage Vcc).

Step 5: When the PA inputs are [00H], or when the photographer pushes the release button to the second stroke, procedure to exposure mode is executed. The PE3 output becomes "1", sustaining the ON state of the transistor TR1 to latch the voltage Vcc.

Step 6: The APEX value Tv of shutter time in the form of a 4-bit digital value from the A/D converter ADC is introduced. Since the number of bits is four, the possible decimal numbers are "0" through "15".

Step 7: Since the PG inputs of step 6 are stored in an accumulator A, this value is transferred to an internal register RG1.

Step 8: The PE0 output is changed to "1", causing the transistor TR2 turn on so that the capacitor C0 which has so far been charged to almost equal a voltage to the battery voltage Vcc is suddenly discharged to the first latch control solenoid MG0. Thereby, a mechanical release is actuated.

Step 9: The flow is waited for a certain time by a timer. A program for this purpose is, for example, to put a certain value into the accumulator A, and then subtract one by one from that value until A=0. The time necessary to do this may be used as the waiting time. The program procedure is not shown because the flow chart would become very complicated. For note, TIME2 to TIME4 have similar programs.

Step 10: The PE0 output is then changed to "0", thereby the current supply to the first latch control solenoid MG0 is cut off. TIME1 may be determined to be slightly longer than the minimum time for which the first latch control solenoid MG0 is energized. After that, the mechanical sequence of operation goes on so that the diaphragm is closed down to the presetting, and the mirror is moved upward.

Step 11: The PA1 input representing the movement of the mirror is taken up. In a certain time from the release of the mirror from the latching connection by MG0, the mirror should reach the terminal end of movement.

Step 12: A routine for waiting the mirror until it reaches the non-viewing position. When this position is reached, step 13 is executed. This routine is provided for ascertaining that the mirror is moved away completely from the light path to the exposure aperture, before the shutter is opened.

Step 13: The flag F0 is examined. F0=1 represents the film end.

Step 14: The flag F1 is examined. F1=0 represents the termination of each cycle of film winding operation.

Step 15: Whether or not the value of the internal register RG1 is "0" is examined. As has been described above, when the computed shutter time is shorter than 1/1000 sec., the PG inputs take "0000", or RG1=1.

Step 16: If RG1=0, it is forced to RG1, or the shutter time is fixed to 1/1000 sec.

Step 17: Whether or not RG1>8, or the shutter time is longer than ⅛ sec. is examined.

Step 18: If RG1>8, it is forced to RG1=8, or the shutter time is fixed to ⅛ sec.

Step 19: The accumulator A is incremented by "1". Routines in steps 19 to 22 are to convert the value of the internal register RG1 representing the sutter time to elongate as multiplied by 2 in sequence.

Step 20: "1" is subtracted from the value of the internal register RG1, and then put again into it.

Step 21: Whether or not RG1=0 is examined. If it is "0", jump to step 23. If not, advance to step 22.

Step 22: The content of the accumulator A is shifted to the left, or doubled. On assumption that the accumulator A has 8 bits, then when, for example, RG1=8, the content of the accumulator A is shifted 7 times. Since the initial content of the accumulator A was [00000001], it, therefore, becomes [10000000].

Step 23: The content of the accumulator A is transferred to the internal register RG1. Thus, the shutter time is elongated in multiplied-by-2 serial fashion.

Step 24: The PE1 output is changed to "1", causing the leading curtain control solenoid MG1 to be supplied with current. The leading curtain starts running.

Step 25: A waiting time is formed by a constant time timer.

Step 26: The content of the internal register RG1 is reduced by "1".

Step 27: The steps 25 to 27 are repeated until the content of the internal register RG1 becomes "0". In this step, an actual time of the shutter time is counted.

Step 28: The PE2 output is changed to "1", causing the trailing curtain control solenoid MG2 to be supplied with current. The trailing curtain runs down, terminating the operation of the focal plane shutter.

Step 29: A time necessary for the trailing curtain to travel across the film gate is formed by a constant time timer.

Step 30: Reset to PE1=PE2=0. So the leading and trailing curtain control solenoids MG1 and MG2 are deenergized.

Step 31: An input from the trailing curtain sensor switch swCN2 is taken up.

Step 32: A routine for waiting swCN2 to open or waiting up for the completion of the running down of the trailing curtain. When it has run down, advance to step 33.

Step 33: PD0=1, PD1=1 render the drive circuit DR1 operative. The charge motor M1 starts to rotate. Thereby, the shutter, mirror and automatic diaphragm are charged.

Step 34: Wait for a time from the start of current supply to the motor M1 to start energization of the wind-up motor M2, until the current flowing through the winding of the motor M1 becomes stable. Thereby, the rush currents in the initial stages of operation of the motors M1 and M2 are prevented from superimposing one upon another.

Step 35: PB0=0, PB1=1 render the drive circuit DR2 operative. The motor M2 starts to rotate. Thereby the film is wound up.

Step 36: Set a constant K in a timer TMR for timer interruption. K is taken at a value depending on the winding-up speed of the film, the number of equally divided parts of the pulse disc P1 (FIG. 6) of the first film switch swFLM1, and the period of instruction cycle of the microcomputer COM.

Step 37: Start the timer TMR for timer interruption. Enable the timer interruption (EN T). Input a constant M into the internal register RG2. Set the flags F0=F2=F3=0, F1=1. The flag F2 represents the ON or OFF state of the first film switch swFLM1, and the flag F3 represents the ON or OFF state of the second film switch swFLM2. The timer TMR since started is decremented repeatedly independently of the main program routine. For every prescribed time (dependent on the constant K), interruption is effected with jump from the executed program to a specific timer interruption address. Here, the timer interruption procedure is explained by reference to FIG. 11.

Timer Interruption Procedure

Step 101: Prohibit decrement and interruption of timer TMR.

Step 102: Input PF0 from the first film switch swFLM1.

Step 103: If PF0=0, advance to step 104. If PF0=1, jump to setp 114.

Step 104: Because PB0 remains the same as that set in step 35, the current supply to the wind-up motor continues.

Step 105: Test flag F2. Because F2 has been set in step 37, advance to step 106.

Step 106: Decrease the content of the internal register RG2 by "1".

Step 107: Test RG2=0. Since, in the up-to-present program, RG2=M−1, for, as M is somewhat large a value, it does not become "0", advance to step 108.

Step 108: Input PF1 from the second film switch swFLM2.

Step 109: Test PF1=0. If the film is not being advanced just before the terminal end of length of one frame yet, PF1=1. So, advance to step 110.

Step 110: Input PF2 from 3rd film switch swFLM3.

Step 111: Test PF2=0. If the cycle of film winding operation is not completed yet, PF2=1. So advance to step 112.

Step 112: Set the constant K in the timer register again, causing the timer TMR to start so that interruption is enabled.

Step 113: Return to the original program under execution. The timer interruption subroutine is to turn away from the program under execution to going for testing the states of the three film switches swFLM1, swFLM2 and swFLM3 in every certain time. Since the program itself goes with the instructions each of which is executed at a very high speed, the recycling of the input of film winding up information in the certain period does not actually give rise to a problem.

Now assuming that a certain cycle of execution of the timer interruption subroutine is encountered with opening of the first film switch swFLM1, then jump from step 103 to step 114.

Step 114: Test flag F3=1. Since F3=0 has been set in step 37, advance to step 115.

Step 115: Test flag F2=1. Since F2=0 has been set in step 37, advance to step 116.

Step 116: Set flag F2 to "1". This means that the first film switch swFLM1 has turned off, in other words, the input PF0 has changed to 1.

Step 117: Set again the internal register RG2 to the constant M. Then, jump to beginning of the aforesaid subroutine with step 108. Here, for a little while, the winding-up is carried out. Suppose a moment just before the terminal end of one-frame movement of the film. Since, at this time, the second film switch swFLM2 turns on, PF1=0 appears, causing step 109 to be followed by step 118.

Step 118: Set flag F3 to "1". In the subsequent cycle of execution of the timer interruption subroutine, therefore, a jump to step 119 occurs at step 114.

Step 119: Set PB0=1. Since PB1=1 has been set in step 37, the wind-up motor M2 is deenergized, and, at the same time, braked. But inertia does not allow the motor M2 to stop immediately. So it continues rotating. By the subsequent cycle of execution of the timer interruption subroutine, as the first film switch swFLM1 changes from OFF to ON, step 103 is followed not by step 114, but by step 104. Since PB0=0 takes place again, the motor M2 is energized for the second time. Since, at this time, F2=1 as has already been set in step 116, advance to step 120.

Step 120: Set flag F2 to "0", and then jump back to step 117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has completed, the third film switch swFLM3 is turned on. So, a jump from step 111 to step 121 takes place.

Step 121: Brake the motor M2 as in step 119.

Step 122: Set flag F1 to 0, which represents the termination of the film winding operation. Then, jump back to step 113 where the subroutine transits to the original program. Because step 112 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step 106, therefore, the content of the internal register RG2 is subtracted by 1 in each cycle of execution of the timer interruption subroutine. When RG2=0 is reached in some cycle number, a jump from step 107 to step 123 takes place.

Step 123: Set PB0=PB1=0, causing both ends of the winding of the motor M2 to open.

Step 124: Set flag F0=0, which represents the film end.

The above-described loop beginning with the step 37 of the main routine is executed always until the next shot goes to step 15. Thus, the film winding operation is controlled accurately.

We now proceed to explain the remain of the main program routine.

Step 38: Input a signal representing that the shutter, mirror and automatic diaphragm have been charged from the charge switch swCGE.

Step 39: A routine comprised together with step 38 for waiting until the charging is completed. Of course, during this time, a necessary number of cycles of timer interruption procedure are carried out.

Step 40: Change PD0 output to 1, causing the charge motor M1 to be braked.

Step 41: Test the flag F0 which represents the film end. Now suppose the film is not all exposed, then advance to step 42.

Step 42: Similar to step 2.

Step 43: If the photographer continues pushing the release button with intension of shooting in the continuous run mode, the second-stroke dependent switch sw2 remains ON, so that the PA inputs have a hexadecimal number of [00H], causing a jump back to step 6: NEXT.

With the step 6, as has been described above, the photographing sequence begins. It should be pointed out here that without making determination of when the film winding operation is terminated, step 8 is executed to activate the first latch control solenoid MG0. In fact, the preparation for an exposure or the adjustment of the diaphragm to the presetting and tne upward movement of the mirror, is carried out regardless of whether or not the film winding operation in the preceding shot is terminated, thereby giving an advantage that the firing rate of shots is increased. After that, the termination of upward movement of the mirror is determined in step 12, and the termination of the film winding operation is determined in step 14. Until now, the timer interruption is repeated any number of times. Upon detection of the termination of the film winding operation, advance to the next step for shutter control.

Next explanation is given to the single frame shooting mode. Since, after each shot, the photographer must have continued pushing the release button in the second stroke, step 43 is followed by step 44.

Step 44: Test the completion of the winding by the timer interruption procedure, or F1=0. If not, repeat steps 41 to 44. Upon completion of the winding, jump back to step 1: START. In step 4, the battery voltage Vcc is then released from the latching. If the first stroke dependent switch sw1 also is OFF, the supply of the voltage Vcc is cut off.

Rewind Procedure

When the film is tensioned at an intermediate point during the winding operation, the execution of the timer interruption subroutine results in F0=1, causing the flow to be branched from step 41 to step 45.

Steps 45-47: Energize solenoid MG2 for a certain time, causing the trailing curtain to run down as in steps 28 to 30. This is because the film is protected against fogging when it happens that the photographer while having carelessly taken the lens off the camera body and been exposing the shutter to strong light, carries out the rewinding. Since both of the leading and trailing curtains are present in front of the exposure aperture, the strong light can be shut out perfectly from the film surface.

Step 48: Input a signal from the trailing curtain sensing switch swCN2.

Step 49: Wait for the completion of running down of the trailing curtain. Upon completion, then advance to step 50 shown in FIG. 10B.

Step 50: Deposit a constant M0 in the internal register RG2.

Step 51: Set PB0=0 and PB1=1, causing the wind-up motor M2 to rotate in the clockwise direction so that the wind-up transmission system is changed over to the small speed reduction ratio.

Step 52: Wait for a time by a constant time timer.

Step 53: Set PB1=0, opening both ends of winding of the wind-up motor M2.

Step 54: Wait for a time by a constant time timer.

Step 55: Subtract "1" from the content of the internal register RG2.

Step 56: Repeat the steps 51 to 56 until RG2=0, that is, M0 times. Thereby, the wind-up motor M2 is subjected to the duty control: current supply→opening across both ends of winding→current supply→opening across both ends of winding and so on, rotating with a weak torque of clockwise direction to turn the planetary lever 219a (FIG. 6) in the counterclockwise direction. So the large gear 205a is brought into meshing engagement directly with the spool gear 210. Thus the spool 22 tends to rotate in the wind-up direction. But, at this time, because of the duty control, for example, even when the film is in tension, no excessive stress is given to the film. A similar effect can be obtained by lowering the voltage across both ends of winding of the wind-up motor M2.

Also, by repeating the steps 51 to 56, the fidelity of meshing engagement of the large gear 205a with the spool gear 210 can be increased. That is, generally speaking, it often happens that the large gear 205a and the spool gear 210 strike each other tooth against tooth and repel each other when the planetary lever 219a turns in the clockwise direction, taking a long time to be in good mesh with each other. But, by repeating the steps 51 to 56 a predescribed number of times, it is made possible to bring them into reliable mesh with each other in a shorter time.

Step 57: Set PC0=0, PC1=1, causinq the drive circuit DR3 to energize the rewind motor M3. Thus, a rewinding operation starts.

Steps 58-64: Exactly the same as the steps 51 to 56 for duty control of the wind-up motor. At this time, the rewind motor M3 and the wind-up motor M2 are simultaneously energized to pull each other through the film, thereby the large gear 205a and the spool gear 210 are further reliably engaged with each other. This meshing engagement is maintained during the rewinding operation. Next, the flow advances to step 65.

Step 65: Set the internal register RG2 to M1.

Steps 66-74: Determine when the film leader comes across the drive sprocket 29a. This program for detecting the stoppage of the sprocket 29a from further rotation is similar to the film motion detecting program described in connection with the steps 102, 103, 105, 106, 107, 115, 116, 117 and 120 of the timer interruption procedure. Upon completion of the rewinding. Then advance to step 75.

Step 75: Change to PC0=1, causing the rewind motor M3 to stop.

Step 76: Reset flag F0 to "0" which represents the film end.

Step 77: Set PD0=0, PD1=1, causing energization of the charge motor M1. This is because the trailing curtain ran down in step 45 to prepare for the rewinding, for the shutter mechanism is charged.

Step 78: Input a signal from the charge switch swCGE.

Step 79: Wait for the completion of the charging before an advance to step 80.

Step 80: Stop the motor M1. Thus, the rewind procedure all comes to end. Exit this subroutine.

In connection with the continuous shooting mode, we should consider a particular situation where the charging of the shutter, mirror an automatic diaphragm terminates so far earlier than the termination of the film winding operation that after the first latch control solenoid MG0 has been energized to actuate the next camera release, the film is tensioned, as the film end comes up.

In this situation, though the diaphragm has been closed down and the mirror has been moved upward in response to energization of the solenoid MG0, the film gets stopped from further movement to the length of one frame so that the third film switch swFLM3 remains OFF. If the camera is made automatically switched to the rewind mode even under such conditions, the photographer would mistake the execution of the rewinding operation as that the shutter has opened and closed. So he would later have an erroneous management. Also, because the mirror is held in the non-viewing position, when the lens is pointed toward a very intense light source, the film will be fogged. For this reason, it is recommended to set the mirror down before the film is rewound.

Upon detection of the film end in the timer interruption procedure at a time after the mirror-up has been determined in step 12 and when the completion of the winding is waited in steps 13 and 14, for the flag F0 is set to "1" in step 124, the flow is branched at step 13 to step 81.

Step 81: Change to PD0=0, PD1=1, causing the motor M1 to rotate.

Steps 82-83: Detect the charge end.

Step 84: Change to PD0=1, causing the motor M1 to be braked. Thereupon, the mirror is charged, returning down to the initial position. Then jump back to step 45: RWND, and initialize the rewind procedure.

As has been described above, according to the first and second embodiments, control means is provided for previously changing over the wind-up transmission system to a smaller one of two speed reduction ratios when to rewind the film. Thus, since the rewinding of the film is carried out under the condition that the wind-up transmission system whcich is left connected to the rewind motor when in the rewind mode is always changed over to the smaller one of the speed reduction ratios, it is possible to prevent the load of the rewind motor from becoming excessive.

Figure 12A:
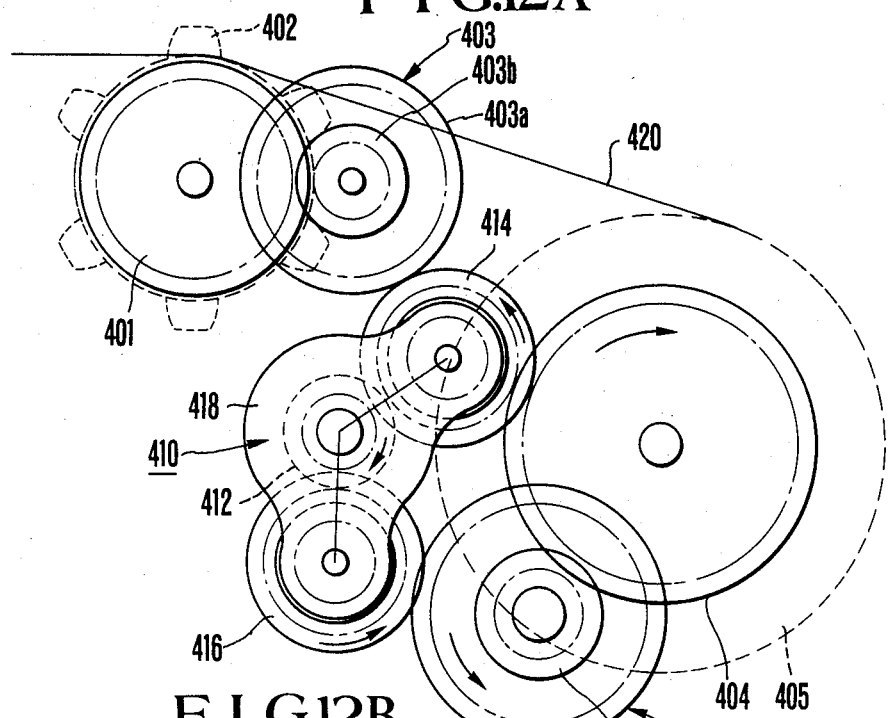
FIGS. 12A and 12B are plan views of a wind-up transmission system which is the prerequisite of a third embodiment of the invention.
Figure 12B:
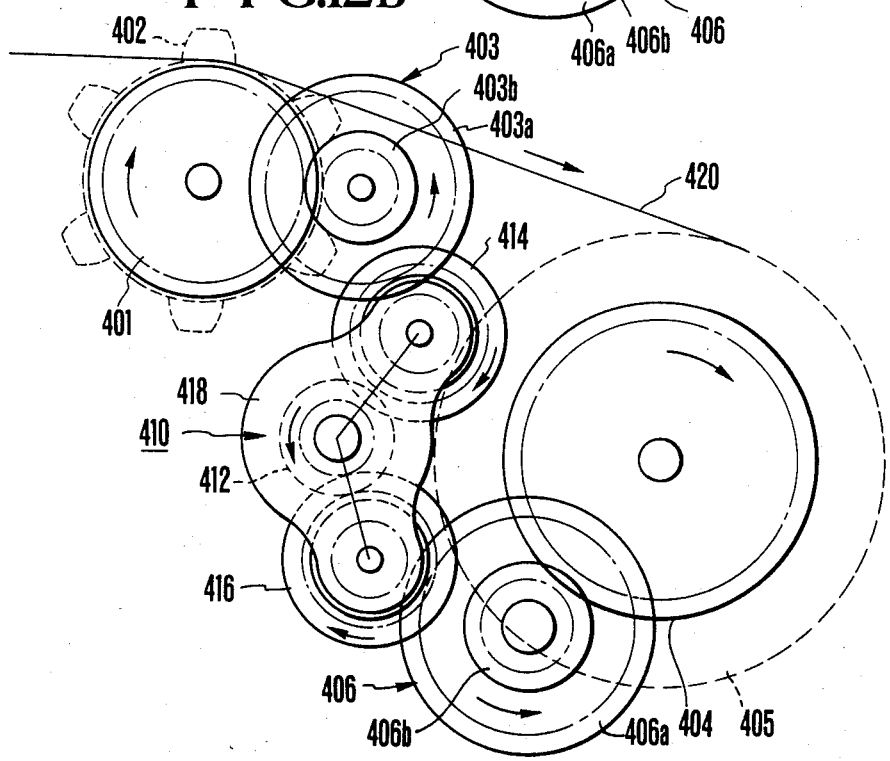

FIGS. 12A and 12B illustrate a motor driven transportation mechanism in the camera which is the premise of a third embodiment of the invention. A sprocket gear 401 and a sprocket 402 are mounted on a common shaft and connected to each other by known mechanism, for example, a oneway clutch having a coil spring whose constraining function is used for transmitting the driving torque in only one direction so that when the speed of rotation of the sprocket 402 in the clockwise direction overtakes the sprocket gear 401, they are released from driving connection. A first transmitting gear 403 in 2-stage form has a large gear 403a and a small gear 403b, the small gear meshing with the aforesaid sprocket gear 401. A spool gear 404 rotates in unison with a spool 405. A second transmitting gear 406 in 2-stage form has a large gear 406a and a small gear 406b, the small gear 406b meshing with the aforesaid spool gear 404.

A planetary clutch mechanism 410 comprises a sun gear 412, planetary gears 414 and 416 and a planetary lever 418. The sun gear 412 is connected to the output shaft of the reversible wind-up motor either directly or through a gear train. The planetary gears 414 and 416 are rotatably mounted on the planetary lever 418, meshing with the sun gear 412. The planetary lever 418 is pivotal about a common axis of rotation of the sun gear 412 and frictionally contacts with the sun gear 412 so that it swings to a direction depending on the direction of rotation of the sun gear 412. That is, as shown in FIG. 12A, when the sun gear 412 rotates in the clockwise direction; the planetary lever 418 is turned also in the clockwise direction, bringing the planetary gear 414 into meshing engagement with the spool gear 404. Thus, the driving torque of the wind-up motor is transmitted through the sun gear 412, planetary gear 414 and spool gear 404 to the spool 405, that is, the high speed wind-up transmission system of small speed reduction ratio is established. On the other hand, when the sun gear 412 rotates in the counteclockwise direction as shown in FIG. 12B, the planetary lever 418 is swung also to the counterclockwise direction, brincing the planetary gear 414 into meshing enqagement with the large gear 403a of the first transmitting gear 403, while the other planetary gear 416 is brought into meshing engagement with the large gear 406a of the second transmitting gear 406. Therefore, the driving torque of the wind-up motor is transmitted through the sun gear 412, planetary gear 416, second intermediate gear 406 and spool gear 404 to the spool 405. Thus, the low speed wind-up transmission system of large speed reduction ratio is established. Also, in this case, the driving torque of the wind-up motor is transmitted to the sprocket 402 through the sun gear 412, planetary gear 414, first intermediate gear 403 and sprocket gear 401. Thus, the advanced frame of film by the sprocket 402 is taken up by the spool 405. For note, the peripheral speed of the spool 405 is previously adjusted to be slightly higher than that of the sprocket 402. Therefore, when automatically loading the film 420, before the film leader reaches the spool 405, the sprocket 402 plays a main role in transporting the film. After the film leader is catched by the spool 405, because the speed of rotation of the sprocket 402 becomes faster than that of rotation of the sprocket gear 401, the one-way clutch is rendered idle. Thus, the film 420 is substatially transported by the spool 405 alone.

In such a transportaion device, when rewinding is carried out by the rewind motor shown in FIG. 7, if the low speed wind-up transmission system of FIG. 12B is left operative, the rewinding is accompanied with rotation of that system including the spool 405 in the reversed direction to that when in the wind-up mode. Because this state of the transmission system has the large speed reduction ratio and, therefore, gives a large load to the rewind motor, the resultant large driving torque works between the perforations of the film 420 and the sprocket 402. So there will be produced a problem of tearing the perforations.

To eliminate this problem, what to do is to change over the wind-up transmission system to the high speed side of FIG. 12A. Since the sun gear 412 when in the rewind mode, however, rotates in the counterclockwise direction which corresponds to the low speed side when in the wind-up mode, if the rewinding speed varies to a certain degree, the inertia of the wind-up motor will cause counterclockwise movement of the planetary lever 418 so that the wind-up transmission system is accidentally changed over to the low speed side. Therefore, the above-described problem arises.

Figure 13A:
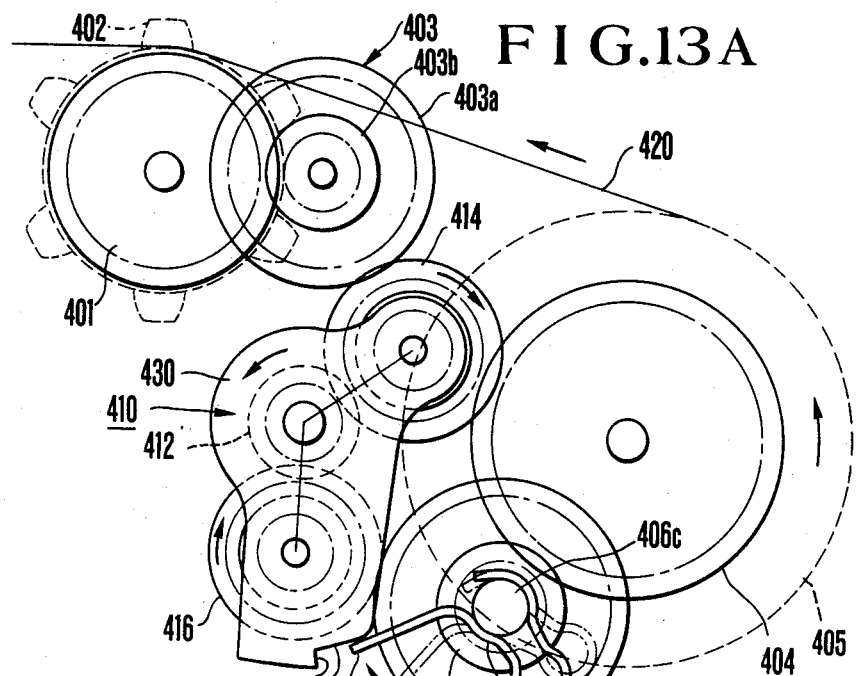
FIGS. 13A and 13B are plan views of the wind-up transmission system as the third embodiment of the invention.
Figure 13B:
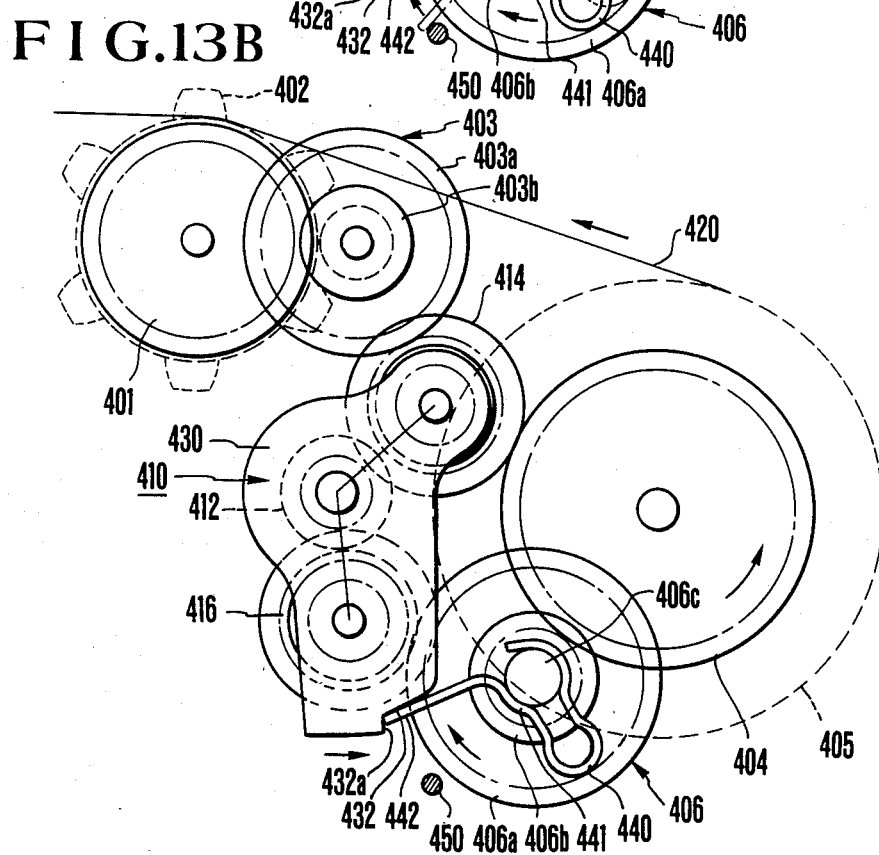

FIGS. 13A and 13B show a third embodiment of the invention which is explained below. For note, the same reference characters have been employed here to denote the similar parts to those shown in FIGS. 12A and 12B.

This embodiment has a feature that the planetary lever 430 is provided with a cutout 432 near the planetary gear 416, and another feature that the rotatable shaft 406c to which the second intermediate gear 406 is fixedly mounted is provided with a planetary changeover regulating member 440.

The regulating member 440 is forced by bending a bar material so that a weak resilient force exerts toward the center, thus having a fritional contact portion 441 witn the aforesaid rotatable shaft 406c and a free end linearly elongated to form a regulating portion 442. When the second intermediate gear 406 rotates in the clockwise direction, therefore, the regulating member 440 is swung also to the clockwise direction, entering the cutout 432 of the planetary lever 430. Conversely when the gear 406 rotates in the counterclockwise direction, it is swung also to the counterclockwise direction, retracting from the cutout 432 toward a stopper 450.

FIG. 13A shows an operative position in which rewinding goes on along with the wind-up transmission system changed over to the high speed side. In this position, the spool 405 is rotated in the counterclockwise direction by the film 420. Therefore, the second intermediate gear 406 rotates in the clockwise direction, thereby the planetary changeover regulating member 440 is swung to the clockwise direction, entering the cutout 432 of the planetary lever 430.

With this, if the rewinding speed changes so that the inertia of the wind-up motor causes counterclockwise movement of the planetary lever 430 as shown in FIG. 13B, because the regulating portion 442 of the planetary changeover regulating member 440 comes to abut on the edge 432a of the cutout 432 of the planetary lever 430, for the planetary lever 430 is hindered from further swinging in the counterclockwise direction, the planetary clutcn mechanism 410 is put in a neutral position. Thus, accidental changing over to the low speed wind-up transmission system can be prevented. Tnerefore, the load on the rewind motor never increases. In such a manner, the problem described inconnection with Figs. 12A ad 12B has been eliminated.

Here, for the completion of rewinding of the film 420, when the film leader moves away from the spool 405, the spool 405 is left free, and the second intermediate gear 406 also stops. In order to take the regulating portion 442 of the planetary changeover member 440 out of engagement with the cutout 432 of the planetary lever 430, the wind-up motor is made rotate for a short time to select the high speed transmission system. Then, the sun gear 412 rotates in the clockwise direction, the planetary lever 430 turns in the clockwise direction, the spool 405 rotates in the clockwise (wind-up) direction, and the second intermediate gear 406 rotates in the counterclockwise direction. Thereby the clutch mechanism 410 is made possible to change over to either of the high and low speed sides.

For note, though the foregoing embodiment has been described in connection of the wind-up transmission system having two different speed reduction ratios from each other, it is to be understood that the present invention when applied to another type of the wind-up transmission system which, though having two transmission systems with the planetary clutch mechanism as the changeover means for the two transmission systems, is not particularly different in the speed reduction ratio between the two transmission systems, produces eguivalent effects to those described above in connection with the embodiments, when the suitable one of the two transmission systems to the rewinding mode is necessarily selected.

As has been described above, the third embodiment is to provide a motor driven transportation device for camera having a wind-up transmission system having two transmission systems different in speed reduction ratio from each other with changeover means therefor in the form of a planetary clutch mechanism, in which accidental changeover of the planetary clutch mechanism is prevented from occurring at a time during rewinding, thus avoiding in advance the production of the problem of tearing the film or the like.

What is claimed is:

1. A motorized camera comprising:
   (a) a winding motor;
   (b) a first wind-up transmission system for driving film to advance by said winding motor as a drive source;
   (c) a second wind-up transmission system for driving the film to advance by said driving motor as a drive source, said second wind-up transmission system having a smaller reduction ratio than said first wind-up transmission system has;

(d) clutch means for changing over the output of said winding motor to said first wind-up transmission system or said second wind-up transmission system;

(e) a rewind transmission system for driving the film to return;

(f) rewind control means for controlling the driving of said rewind transmission system; and (g) changeover control means for changing over said clutch means before the start of driving of said rewind transmission system by said rewind control means, said changeover control means changing over said clutch means so as to connect said output of said winding motor to said second wind-up transmission system when the output of said winding motor is in connection to said first wind-up transmission system.

2. A camera according to claim 1, wherein said clutch means includes a planetary clutch.

3. A camera according to claim 2, wherein said changeover control means drives said winding motor for a prescribed time in such a direction that said planetary clutch connects with said second wind-up transmission system, and wherein the driving of said winding motor for said prescribed time overlaps for a little time with the driving of said rewind transmission system controlled by said rewind control means.

4. A camera according to claim 1, further comprising:
(a) detecting means for detecting the completion of winding up of said film; and
(b) said changeover control means responsive to the detection of completion of winding up by said detecting means for changing over said clutch means, and said changeover control means, when the output of said winding motor is in connection with said first wind-up transmission system, changing over said clutch means so as to connect said output to said second wind-up transmission system.

5. A camera according to claim 1, wherein said changeover control means includes operating means accessible to the photographer, whereby driving of said rewind transmission system is prohibited until said clutch means is changed over to take and bring the output of said winding motor out of connection with said first wind-up transmission system to connection with second wind-up transmission system.

6. A motorized camera comprising:
(a) a first motor;
(b) a first wind-up transmission system for driving the winding up of film by said first motor as a drive source;
(c) a second transmission system for driving a camera operating mechanism by said first motor as a drive source, said second transmission system having a smaller reduction ratio than said first wind-up transmission system;
(d) clutch means for changing over the output of said first motor to said first wind-up transmission system or to said second transmission system;
(e) a second motor;
(f) a rewind transmission system for driving the rewinding of the film by said second motor as a drive source;
(g) rewind control means for controlling the driving of said rewind transmission system; and (h) changeover control means for changing over said clutch means before the start of the driving of said rewind transmission system by said rewind control means, said changeover control means, when the output of said first motor is in connection with said first wind-up transmission system, changing over said clutch means so as to connect said output with said second transmission system.

7. A motorized camera comprising
(a) a first motor;
(b) a first wind-up transmission system for driving the winding up of film by said first motor as a drive source;
(c) a second wind-up transmission system for driving the winding up of film by said first motor as a drive source, said second wind-up transmission system having a smaller reduction ratio than said first wind-up transmission system;
(d) clutch means for changing over the output of said first motor to said first wind-up transmission system or to said second wind-up transmission system;
(e) a second motor;
(f) a rewind transmission system for driving the rewinding of the film by said second motor as a drive source;
(g) detecting means for detecting the completion of winding up of said film;
(h) changeover control means responsive to detection of the completion of winding up of said film by said detecting means for changing over said clutch means, said changeover control means, when the output of said first motor is in connection with said first wind-up transmission system, changing over said clutch means so as to connect said output to said second wind-up transmission system; and
(i) rewind control means for starting driving of said second motor after said clutch means has been changed over by said changeover control means.

8. A motorized camera comprising:
(a) a first motor;
(b) a first wind-up transmission system for driving the winding up of film by said first motor as a drive source;
(c) a second wind-up transmission system for driving the winding up of film by said first motor as a drive source, said second wind-up transmission system having a smaller reduction ratio than said first wind-up transmission system;
(d) clutch means for changing over the output of said first motor to said first wind-up transmission system or to said second wind-up transmission system;
(e) a second motor;
(f) a rewind transmission system for driving the rewinding of the film by said second motor as a drive source;
(g) operating means for operating changeover of said clutch means, said operating means changing over the output of said first motor from said first wind-up transmission system to said second wind-up transmission system; and
(h) rewind control means for starting driving of said second motor after said change-over of said clutch means by said operating means.

9. A camera according to claim 7, further comprising second rewind control means for causing said first motor to be driven in a rewind direction in response to the driving of said second motor by said rewind control means.

10. A motorized camera comprising:
(a) a reversible winding motor;
(b) a first wind-up transmission system for driving the winding up of film by said winding motor as a drive source;
(c) a second wind-up transmission system for driving the winding up of the film by said winding motor as a drive source;
(d) a planetary clutch for changing over the output of said winding motor to said first wind-up transmission system or to said second wind-up transmission system, whereby changing over of said planetary clutch is carried out by changing over the direction of rotation of said winding motor;
(e) a rewind transmission system for driving the rewinding of the film;
(f) rewind control means for controlling the operation of said rewind transmission system; and
(g) preventing means for preventing the changing over operation of said planetary clutch when said rewind transmission system is operated by said rewind control means.

11. A camera according to claim 10, wherein said preventing means includes a planetary changeover regulating member frictionally connected to a rotatable wheel which is rotated by said film when the film is rewound by said rewind transmission system, said regulating member being arranged to abut on said planetary clutch when said rotatable wheel rotates in the rewind direction of said film, whereby the changing over operation of said planetary clutch is regulated by said abutting.

12. A motorized camera comprising:
(a) a reversible motor;
(b) a first wind-up transmission system for driving the winding up of film by said motor as a drive source;
(c) a second wind-up transmission system for driving a camera operating mechanism by said motor as a drive source;
(d) a planetary clutch for changing over the output of said motor to said first wind-up transmission system or to said second transmission system, whereby changing over of said planetary clutch is carried out by changing the direction of rotation of said motor;
(e) a rewind transmission system for driving the rewinding of the film;
(f) rewind control means for controlling the operation of said rewind transmission system; and
(g) preventing means for preventing the changing over operation of said planetary clutch when said rewind transmission system is operated by said rewind control means.

13. A motorized camera comprising:
(a) a reversible motor:
(b) a first transission system for driving a first camera operating mechanism said motor as a drive source;
(c) a second transmission system for driving a second camera operating mechanism by said motor as a drive source;
(d) a planetary clutch for changing over the output of said motor to said first transmission system or said second transmission system, whereby changing over of said planetary clutch is carried out by changing the direction of rotation of said motor;
(e) drive means for driving said first transmission system or said second transmission system in the reverse direction to that of rotation due to the output of said motor; and
(f) preventing means for preventing the changing over operation of said planetary clutch when said drive means is driven.

14. A motorized camera comprising:
(a) a first motor;
(b) a first wind-up transmission system for driving the winding up of film by said first motor as a drive source;
(c) a second transmission system for driving a carera operatin mechanism by said first motor as a drive source, said sccond transmisson system having a smaller reduction ratio than said first wind-up transmission system:
(d) a planetary clutch for changing over the outut of said first motor to said first wind-up transmission system or to said second transmission system;
(e) a second motor:
(f) a rewind transmission sysrem for driving the rewinding of the film by said second motor as a drive source;
(g) rewind control means for controlling the driving of said rewind transmission system; and
(h) changeover control means for changing over said clutch means before the start of the driving of said rewind transmission system by said rewind control means, said changeover control means, when the output of said first motor is in connection with said first wind-up transmission system, driving said winding motor for a prescribed time in such a direction that said planetary clutch connects with said second wind-up transmission system, the driving of said winding motor for said prescribed time overlapping for a little time with the driving of said rewind transmission system controlled by said rewind control means.

* * * * *